United States Patent
Glickfield et al.

(10) Patent No.: US 9,989,942 B2
(45) Date of Patent: Jun. 5, 2018

(54) PREEMPTIVELY TRIGGERING A DEVICE ACTION IN AN INTERNET OF THINGS (IOT) ENVIRONMENT BASED ON A MOTION-BASED PREDICTION OF A USER INITIATING THE DEVICE ACTION

(71) Applicant: QUALCOMM Incorporated, San Diego, CA (US)

(72) Inventors: Sarah Glickfield, Jerusalem (IL); Gregory Burns, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 14/583,314

(22) Filed: Dec. 26, 2014

(65) Prior Publication Data

US 2015/0185713 A1    Jul. 2, 2015

Related U.S. Application Data

(60) Provisional application No. 61/922,065, filed on Dec. 30, 2013.

(51) Int. Cl.
*G06F 19/00* (2018.01)
*G05B 15/02* (2006.01)
*H04L 29/08* (2006.01)

(52) U.S. Cl.
CPC .............. *G05B 15/02* (2013.01); *H04L 67/12* (2013.01); *G05B 2219/2642* (2013.01); *H04W 4/70* (2018.02)

(58) Field of Classification Search
CPC ... H04L 67/12; G05B 2219/163; H04W 4/005
(Continued)

(56) References Cited

U.S. PATENT DOCUMENTS 7,154,399 B2    12/2006 Cuddihy et al.
7,843,323 B2    11/2010 Lim et al.
(Continued)

FOREIGN PATENT DOCUMENTS

CN    102945029 A    2/2013
EP      2399513 A1   12/2011
(Continued)

OTHER PUBLICATIONS

International Search Report and Written Opinion—PCT/US2014/072591—ISA/EPO—dated Oct. 29, 2015.
(Continued)

*Primary Examiner* — Michael D Masinick
(74) *Attorney, Agent, or Firm* — Muncy, Geissler, Olds & Lowe, P.C.

(57) ABSTRACT

In an embodiment, an apparatus receives report(s) of raw motion data detected in IoT environment, and also receives report(s) indicating user-initiated event(s) detected by a set of IoT devices within the IoT environment. The apparatus scans the raw motion data within a threshold period of time preceding particular detected user-initiated events to identify motion sequence(s) within the IoT environment that occurred during the threshold period of time. Certain motion sequence(s) are correlated with user-initiated event(s) based on a confidence level that the user-initiated event(s) will follow the motion sequence(s). Upon detection of the motion sequence(s) at some later point in time, the correlated event(s) is preemptively triggered without user interaction.

30 Claims, 17 Drawing Sheets

(58) Field of Classification Search
USPC .................................................. 700/44, 63
See application file for complete search history.

(56) References Cited

U.S. PATENT DOCUMENTS

| | | | | |
|---|---|---|---|---|
| 8,880,378 B2* | 11/2014 | Cook | ..................... | G05B 15/02 |
| | | | | 702/181 |
| 2005/0210418 A1* | 9/2005 | Marvit | ..................... | G06F 3/017 |
| | | | | 715/863 |
| 2005/0212754 A1* | 9/2005 | Marvit | ................... | G06F 1/1626 |
| | | | | 345/156 |
| 2005/0212911 A1* | 9/2005 | Marvit | ..................... | G06F 3/017 |
| | | | | 348/154 |
| 2006/0089538 A1 | 4/2006 | Cuddihy et al. | | |
| 2006/0229739 A1 | 10/2006 | Morikawa | | |
| 2008/0130951 A1 | 6/2008 | Wren et al. | | |
| 2009/0125274 A1 | 5/2009 | Waldock et al. | | |
| 2011/0106736 A1 | 5/2011 | Aharonson et al. | | |
| 2011/0205151 A1* | 8/2011 | Newton | ................... | G06F 3/011 |
| | | | | 345/156 |
| 2013/0106686 A1* | 5/2013 | Bennett | ................... | G06F 3/017 |
| | | | | 345/156 |
| 2013/0238538 A1 | 9/2013 | Cook et al. | | |
| 2013/0303198 A1 | 11/2013 | Sadasivam et al. | | |
| 2013/0343601 A1* | 12/2013 | Jia | ..................... | G06K 9/00355 |
| | | | | 382/103 |
| 2015/0355805 A1* | 12/2015 | Chandler | ............... | G06F 3/0482 |
| | | | | 715/784 |
| 2017/0316260 A1* | 11/2017 | Hoy | ................... | G06K 9/00771 |

FOREIGN PATENT DOCUMENTS

| | | |
|---|---|---|
| EP | 2673940 A1 | 12/2013 |
| JP | 2009205648 A | 9/2009 |

OTHER PUBLICATIONS

International Search Report and Written Opinion—PCT/US2014/072591—ISA/EPO—dated Apr. 20, 2015.

* cited by examiner

PREEMPTIVELY TRIGGERING A DEVICE ACTION IN AN INTERNET OF THINGS (IOT) ENVIRONMENT BASED ON A MOTION-BASED PREDICTION OF A USER INITIATING THE DEVICE ACTION

CLAIM OF PRIORITY UNDER 35 U.S.C. § 119

The present Application for Patent claims priority to Provisional Application No. 61/922,065, entitled "PREEMPTIVELY TRIGGERING A DEVICE ACTION IN AN INTERNET OF THINGS (IoT) ENVIRONMENT BASED ON A MOTION-BASED PREDICTION OF A USER INITIATING THE DEVICE ACTION", filed Dec. 30, 2013, by the same inventors as the subject application, assigned to the assignee hereof and hereby expressly incorporated by reference herein in its entirety.

FIELD

Embodiments relate to preemptively triggering a device action in an Internet of Things (IoT) environment based on a motion-based prediction of a user initiating the device action.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

In an embodiment, an apparatus receives report(s) of raw motion data detected in IoT environment, and also receives report(s) indicating user-initiated event(s) detected by a set of IoT devices within the IoT environment. The apparatus scans the raw motion data within a threshold period of time preceding particular detected user-initiated events to identify motion sequence(s) within the IoT environment that occurred during the threshold period of time. Certain motion sequence(s) are correlated with user-initiated event(s) based on a confidence level that the user-initiated event(s) will follow the motion sequence(s). Upon detection of the motion sequence(s) at some later point in time, the correlated event(s) is preemptively triggered without user interaction.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
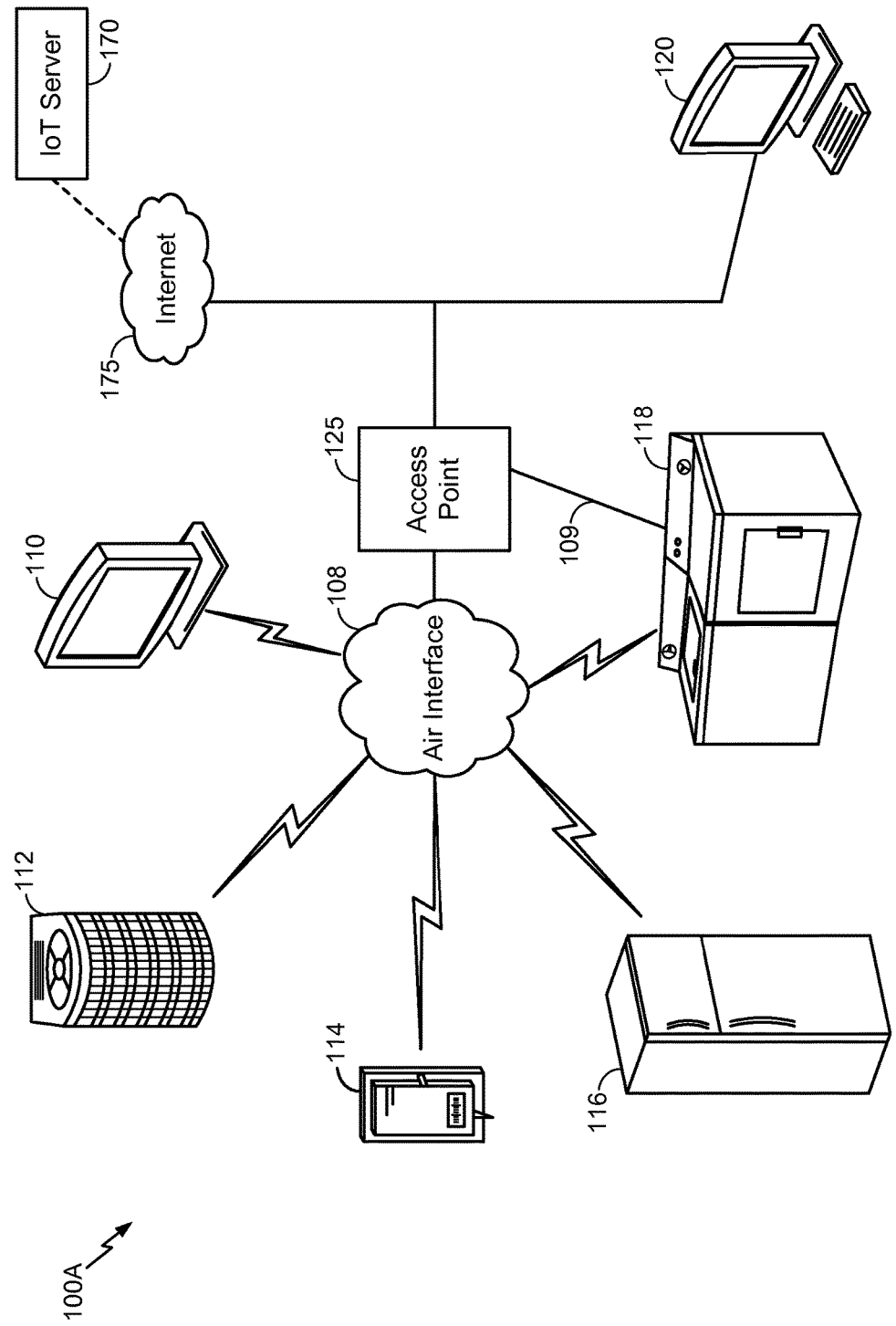
FIG. 1A illustrates a high-level system architecture of a wireless communications system in accordance with an aspect of the disclosure.

Various aspects are disclosed in the following description and related drawings to show specific examples relating to exemplary embodiments of proximity detection between Internet of Things (IoT) devices. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the wired connection 109. Alternatively, or additionally, some or all of IoT devices 110-120 may be configured with a communication interface independent of air interface 108 and wired connection 109. For example, if the air interface 108 corresponds to a Wi-Fi interface, certain of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
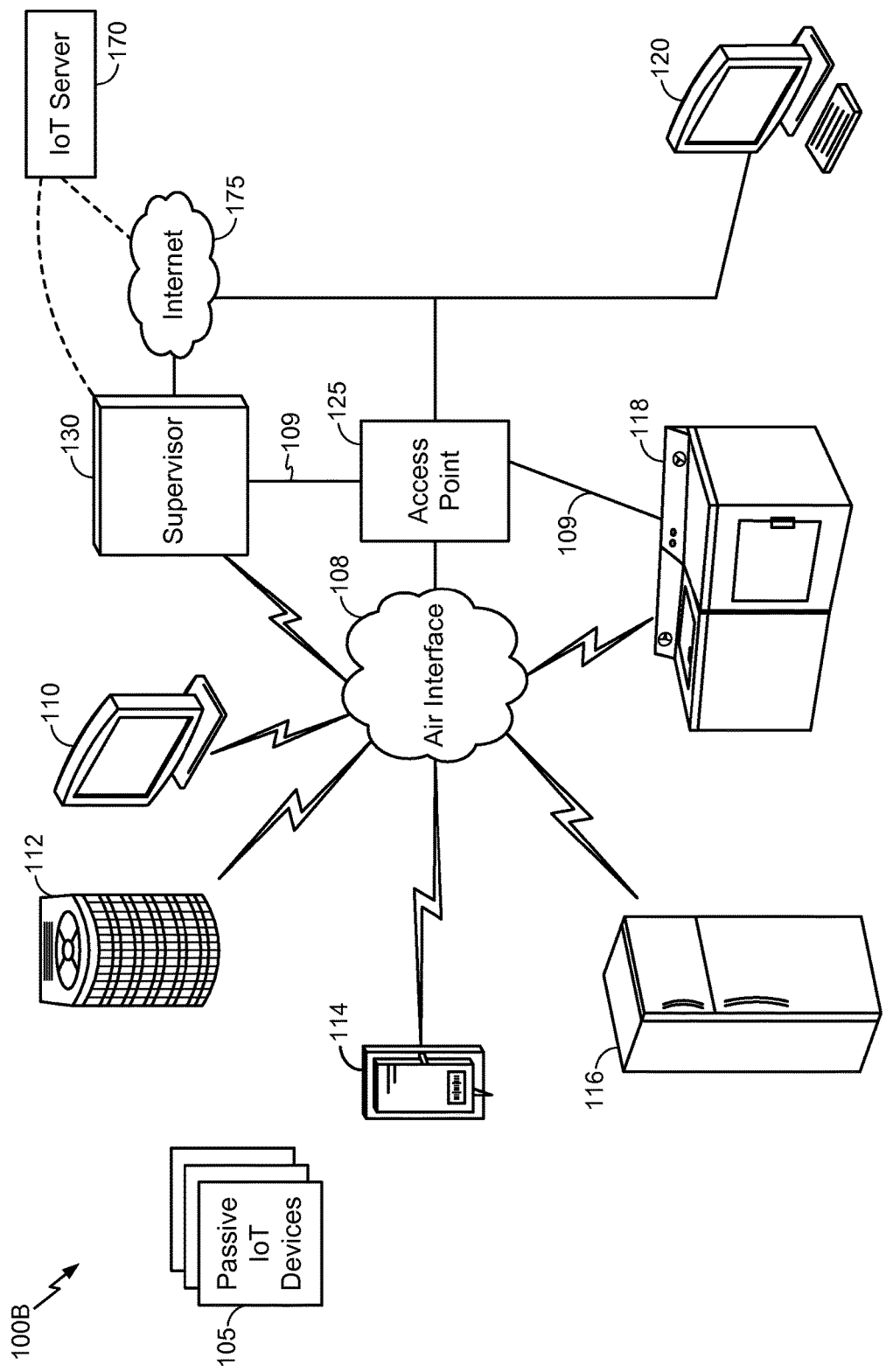
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RF or barcode communication interfaces, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
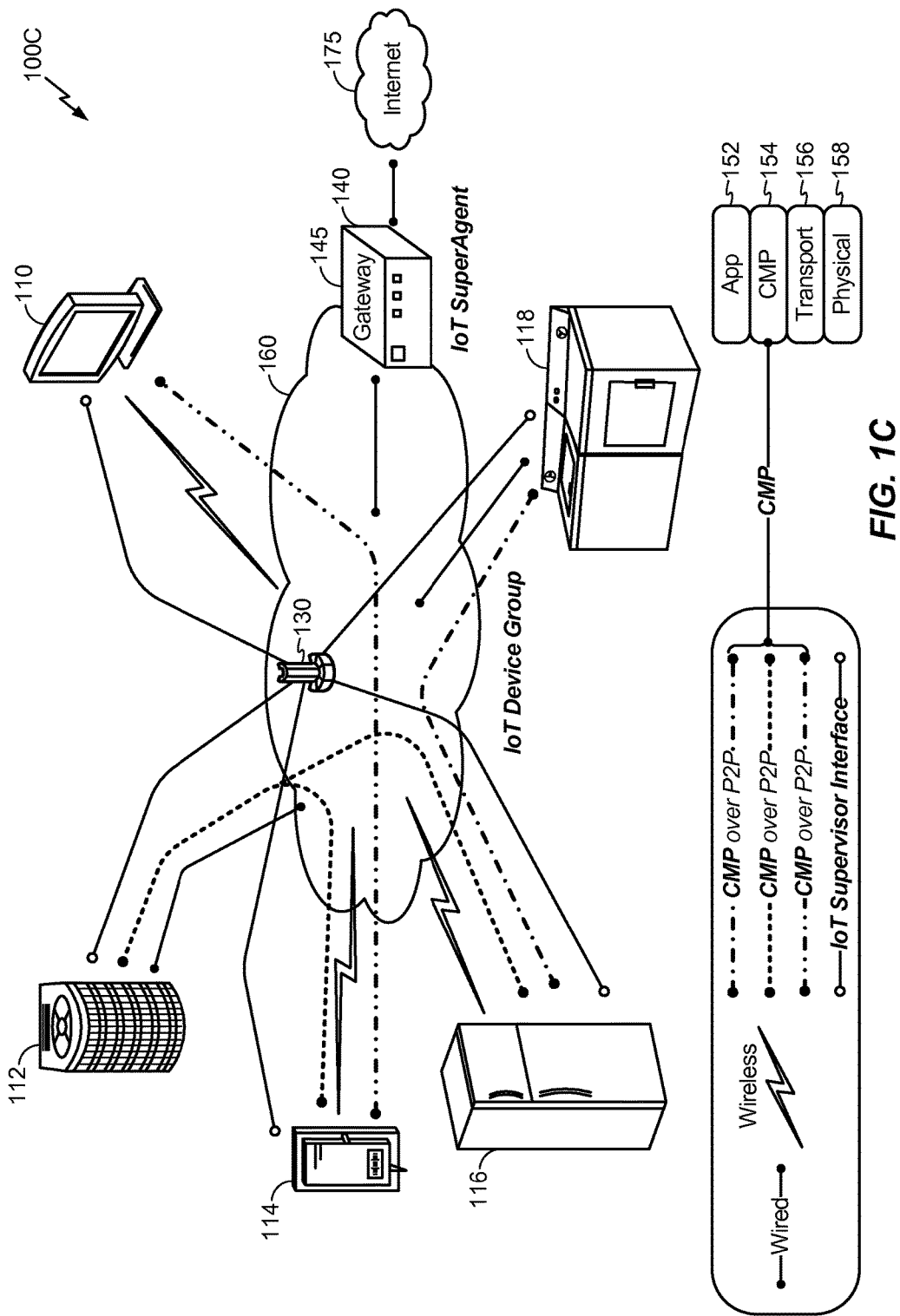
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
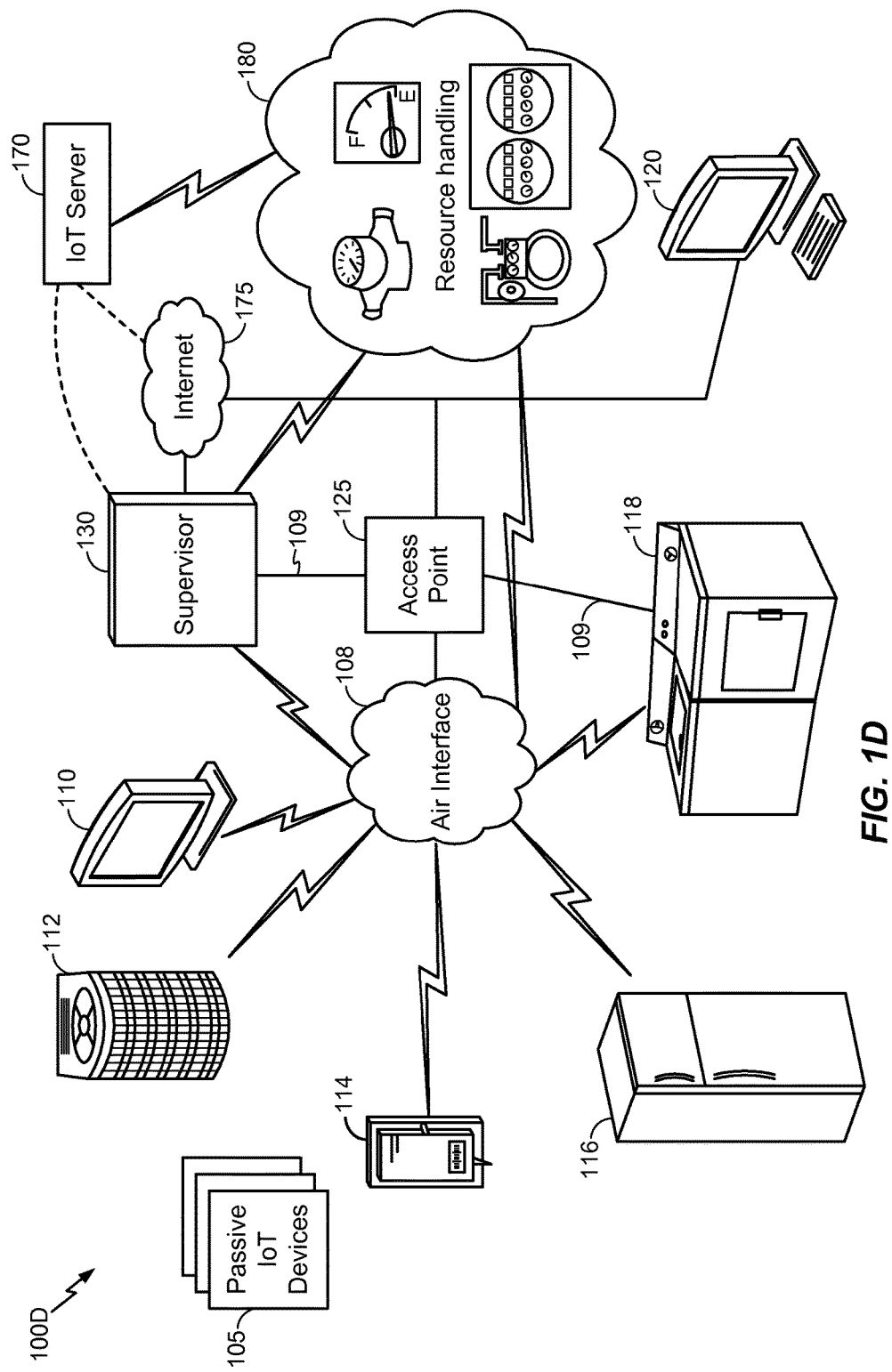
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
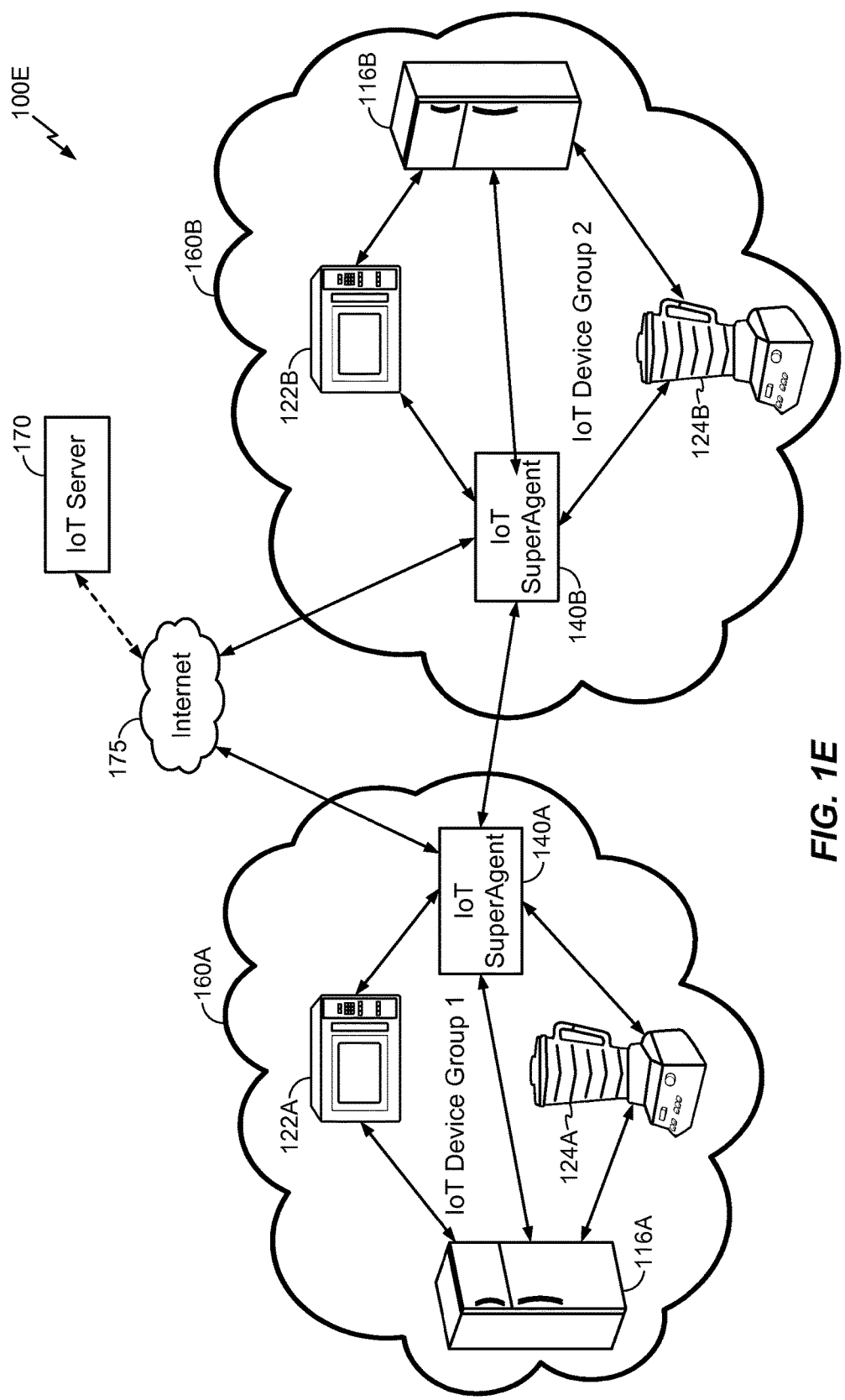
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 160A and 160B, those skilled in the art will appreciate that any number of IoT device groups may suitably communicate with each other using IoT SuperAgents.

Figure 2A:
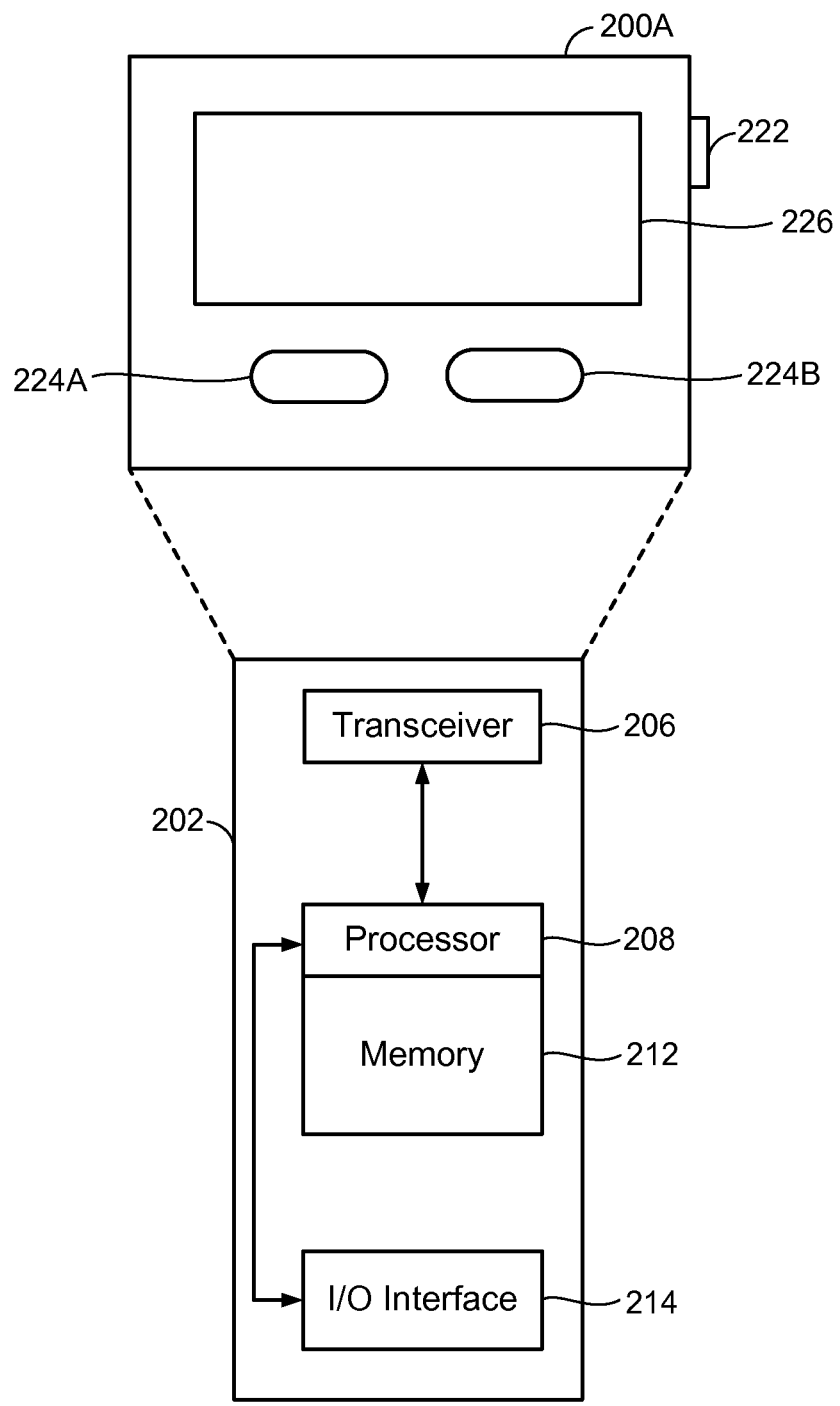

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
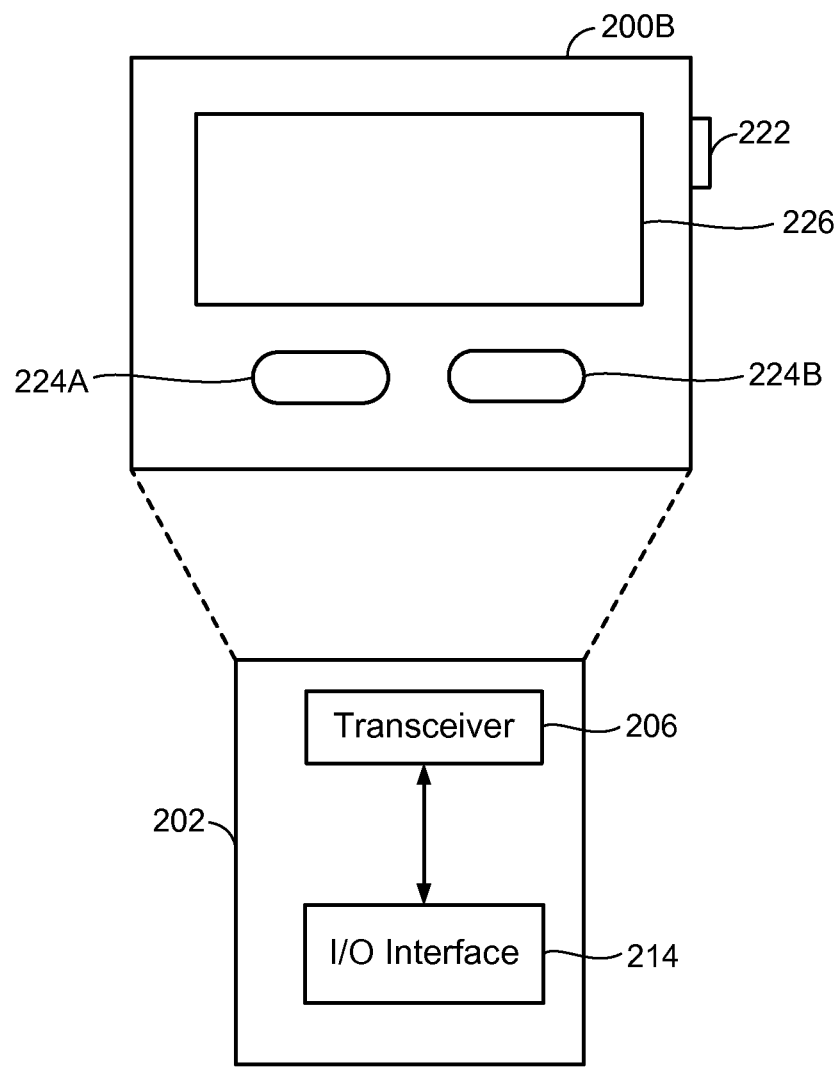
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200A may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
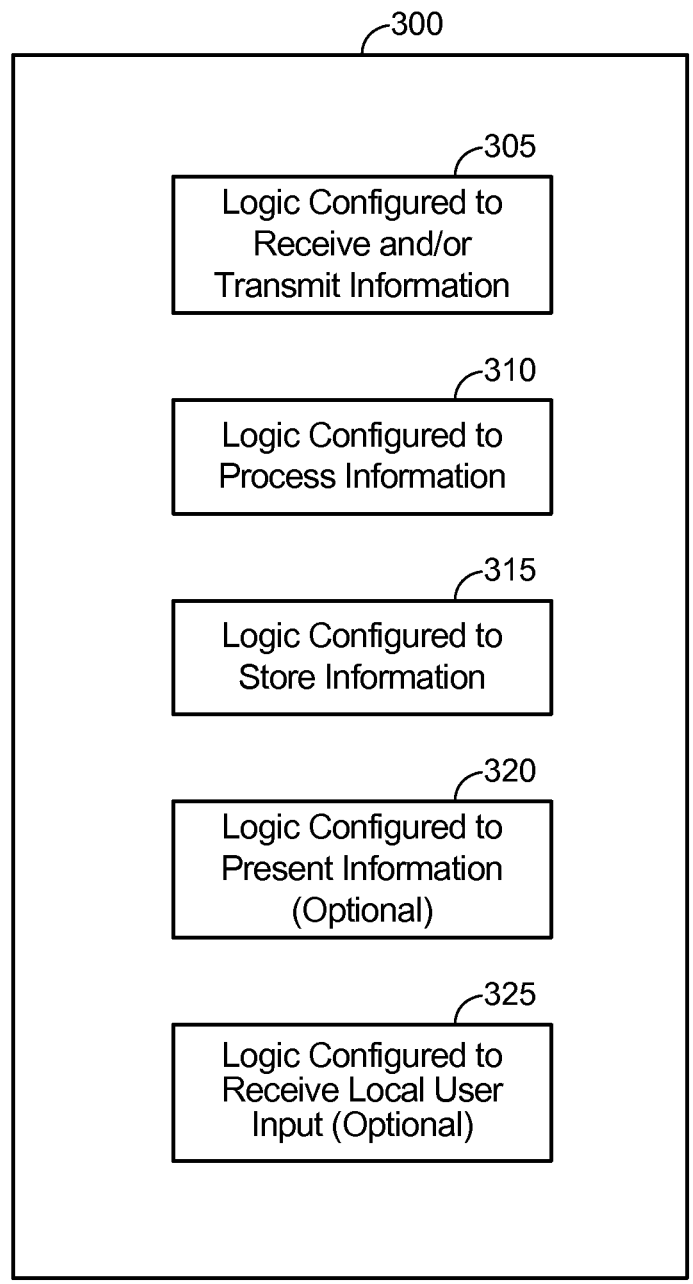
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
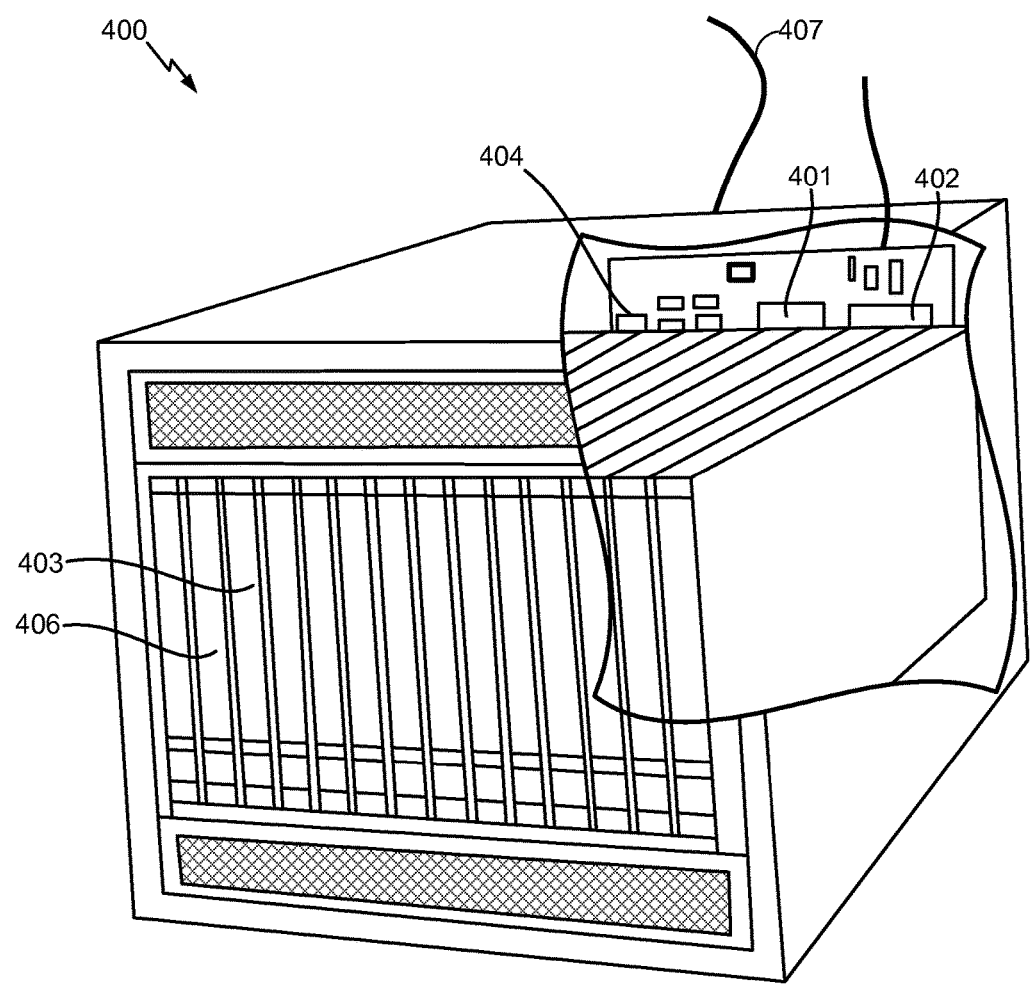
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 400 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

Conventional monitoring devices (e.g., security cameras, outdoor lighting, Wii-motes, Microsoft Kinect, etc.) can be configured to implement motion detection to trigger certain actions. These monitoring devices typically require a manufacturer (or game developer) to define a certain set of motions that will be used to trigger a corresponding action. However, it is difficult for conventional monitoring devices to learn new motions for action-triggering based upon environmental monitoring.

Embodiments of the invention are directed to deploying motion detectors within an IoT environment, whereby events detected by various IoT devices in the IoT environment are correlated with motion sequences that precede the events in order to preemptively trigger certain events within the IoT environment.

Figure 5:
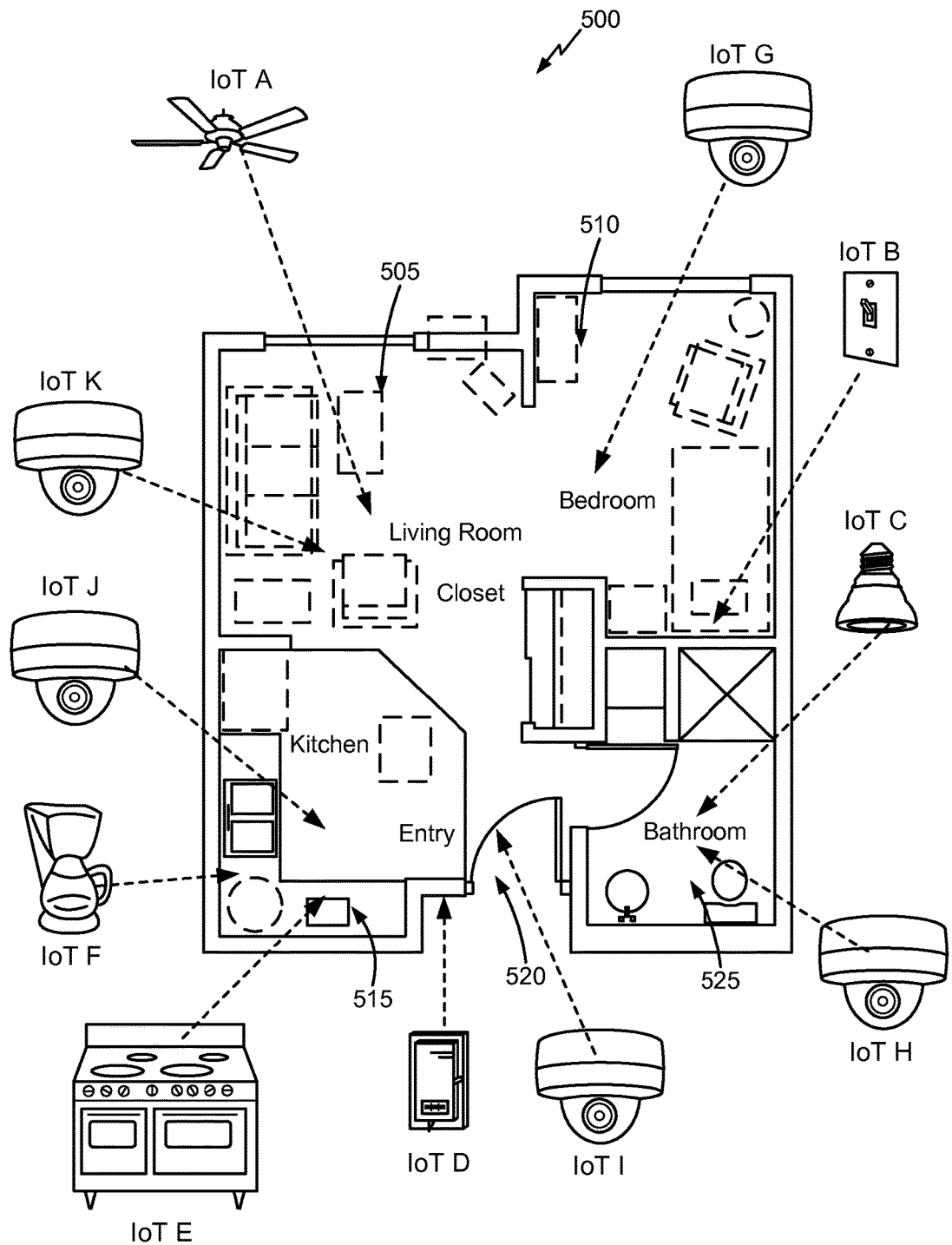
FIG. 5 illustrates an example of a "single user" IoT environment (or distributed IoT network) in accordance with an embodiment of the invention.

FIG. 5 illustrates an example of a "single user" IoT environment (or distributed IoT network) 500 in accordance with an embodiment of the invention. In FIG. 5, the IoT environment 500 is an apartment with a living room 505, a bedroom 510, a kitchen 515 and a bathroom 520, a foyer 520 and a bathroom 525. Within the apartment, IoT device A (e.g., a ceiling fan) is positioned in the living room 505, IoT device B (e.g., a light switch) is positioned in the bedroom 510, IoT device C (e.g., a light bulb) is positioned in the bathroom 525, and IoT devices D (e.g., a thermostat), E (e.g., an oven) and F (e.g., a coffeemaker) are positioned in the kitchen 515. Also, IoT devices G . . . K (e.g., motion sensors or motion detectors) are positioned throughout the apartment 500 in each of areas 505-525. The IoT environment 500 is referred to as a "single user" environment because a single user is expected to predominately occupy the apartment. Characterizing an IoT environment as "single user" simplifies some of the operations described below because motion sequences can be assumed to be performed by the single user without a specialized identification procedure.

Figure 6:
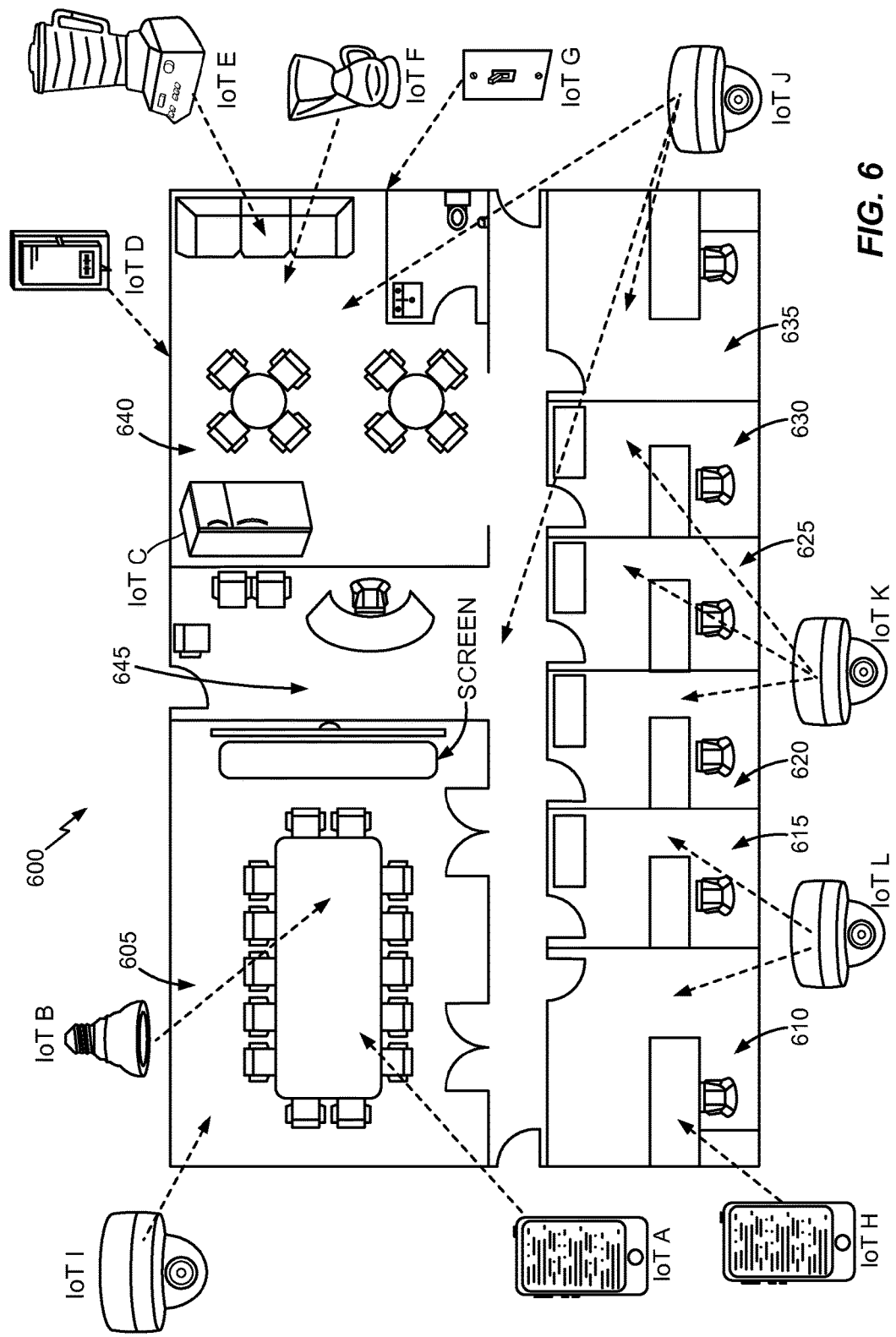
FIG. 6 illustrates an example an example of a "multi user" IoT environment (or distributed IoT network) in accordance with an embodiment of the invention.

FIG. 6 illustrates an example an example of a "multi user" IoT environment (or distributed IoT network) 600 in accordance with an embodiment of the invention. In FIG. 6, the IoT environment 600 is an office space with a conference room 605, a plurality of offices 610 through 635, a kitchen 640 and a reception area 645. Within the office space 600, IoT device A (e.g., a handset device such as a cell phone or tablet computer) and IoT device B (e.g., a light bulb) are positioned in conference room 605, IoT device C (e.g., a refrigerator), IoT device D (e.g., a thermostat), IoT device E (e.g., a blender), IoT device F (e.g., a coffeemaker) and IoT device G (e.g., a light switch) are positioned in the kitchen 640 and IoT device H (e.g., a handset device such as a cell phone or tablet computer) is positioned in office 610. Also, IoT devices I . . . L (e.g., motion sensors or motion detectors) are positioned throughout the office space in each of areas 505-525 605-645. The IoT environment 600 is referred to as a "multi user" environment because different users occupy the office space either at the same time or at different times, so a particular detected motion sequence cannot be associated with a particular user (or group of users) without some type of specialized identification procedure for correlating the particular detected motion sequence to that user (or group of users). Identifying the user (or group of users) associated with a particular detected motion can be implemented in a number of different ways, such as by detecting a phone registered to a user (or group of users) in proximity to the detected motion sequence, determining that only a particular user (or group of users) perform a particular motion sequence, detecting the motion sequence in an office that is assigned to a particular user (or group of users), and so on.

Figure 7:
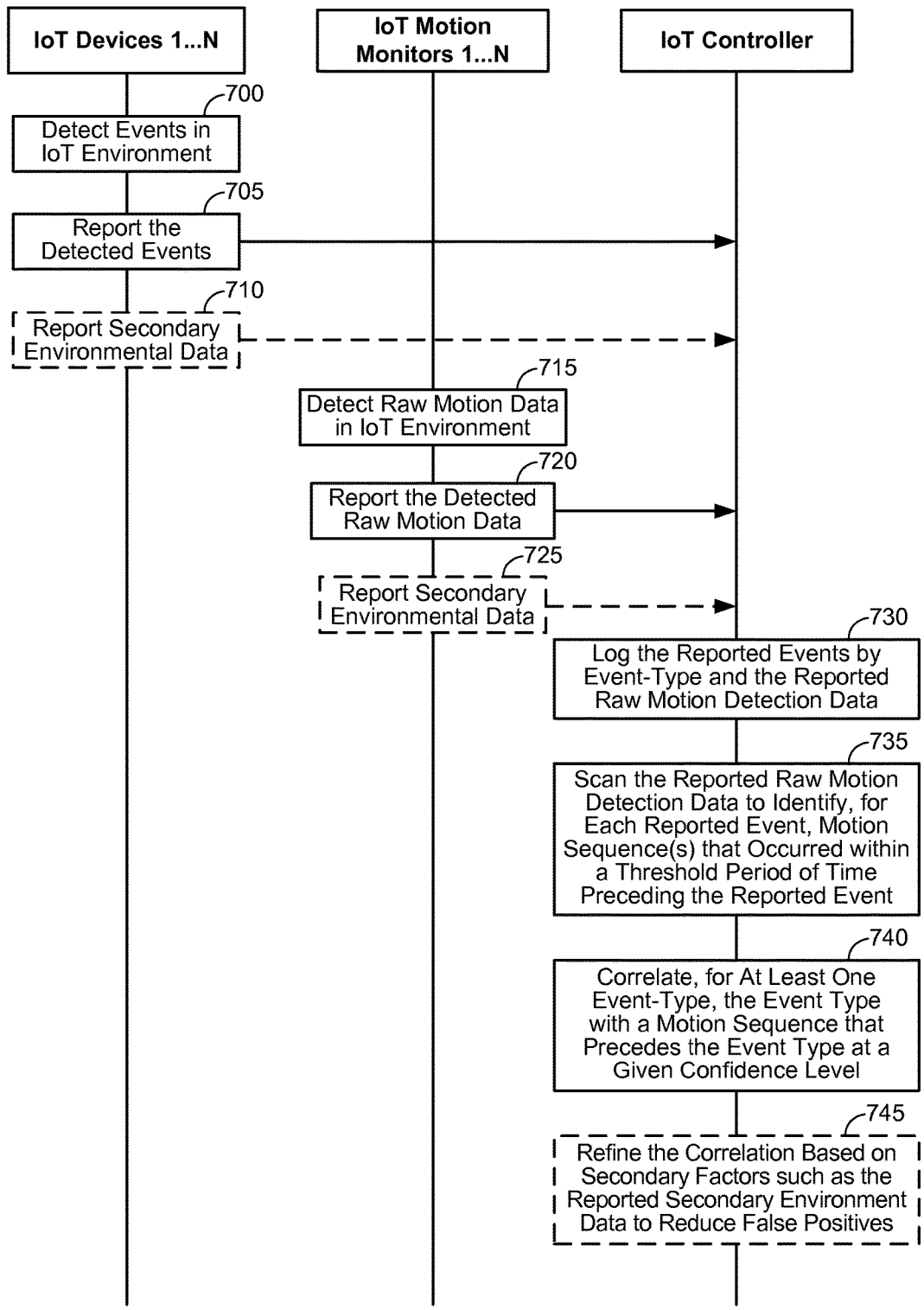
FIG. 7 illustrates a process of correlating a motion sequence with a particular type of event in accordance with an embodiment of the invention.

The embodiments described below with respect to FIGS. 7-9 can be implemented within a single user IoT environment (e.g., such as the single user IoT environment 500 of FIG. 5) or multi user IoT environment (e.g., such as the multi user IoT environment 600 of FIG. 6). While not discussed below in great detail, it will be appreciated that when the process of FIGS. 7-9 is implemented within a multi user IoT environment, the respective processes can be performed in a selective manner either for a particular user or a particular group of users based on a user identification procedure. In the multi user scenario, the processes of FIGS. 7-9 can be executed redundantly for different users (or groups of users) within the same environment, with different motion sequences being correlated with different events on a user-specific or group-specific basis. Accordingly, while the embodiments of FIGS. 7-9 are described above primarily with respect to a single user which would appear to implicate the single user IoT environment, it will be appreciated that these embodiments can be carried over to any multi user IoT environment so long as the motion sequences can be identified as being associated with a specific user or a specific group of users for correlation of motion sequences with events. Additionally, certain motions made by different users may be substantially similar, and therefore may be applied to a group of users or even all users, regardless of user identification. Further, as used herein, an "event" can include a single action or a series of actions. Thus, an event being triggered by a particular motion sequence does not imply that a single action is being triggered (although this is certainly possible), but potentially a series or sequence of actions can be triggered which, when performed together, comprise the event.

FIG. 7 illustrates a process of correlating a motion sequence with a particular type of event in accordance with an embodiment of the invention. Referring to FIG. 7, a set of IoT devices ("IoT devices 1 . . . N") deployed within an IoT environment (e.g., a single user or multi user IoT environment) detect user-initiated events over time, 700. In an example, IoT devices 1 . . . N of FIG. 7 can correspond to IoT devices A . . . F of FIG. 5 or IoT devices A . . . H of FIG. 6. For example, if IoT device 1 is a light switch or light bulb, IoT device 1 can detect events such as an "ON" event or an "OFF" event, a dim setting, etc. In another example, if IoT device 2 is a thermostat, IoT device 2 events such as user-specified changes to target temperature or humidity settings. In another example, if IoT device 3 is an oven, the oven can detect various events such as being switched (or being scheduled to switch) "ON" and "OFF" by a user, but also whether the oven is set by the user to "BAKE" or "BROIL", a temperature setting for the oven, how long an oven timer is set for and so forth. In another example, if IoT device 3 is a coffee maker, the coffee maker can detect events such as being switched "ON" and "OFF" by the user, a fill-level that indicates how much coffee is brewed during a particular brew cycle or over a number of brew cycles, etc. Each detected event is recorded in accordance with its associated time of occurrence (or timing information) at 700.

Referring to FIG. 7, IoT devices 1 . . . N report the detected events and their associated timing information from 700 to an IoT controller either on a periodic basis or an event-triggered basis, 705. The IoT controller can correspond to a server such as IoT server 170, in which case the reports of 705 can be sent over an Internet connection. Alternatively, the IoT controller can be a local server and/or one of the IoT devices in the IoT environment (e.g., an IoT manager or superagent), in which case the reports of 705 can be sent over a local IoT communication interface (e.g., Bluetooth, WiFi, etc.). IoT devices 1 . . . N can also optionally report secondary environmental data to the IoT controller, 710. For example, if IoT device 1 is a ceiling fan, it will be appreciated that the ceiling fan is likely going to be turned on or off based on ambient room temperature. Thus, when the ceiling fan reports an "ON" or "OFF" event, the ceiling fan can either collect temperature information from a local temperature sensor (e.g., a thermostat) for reporting at 710, or the ceiling fan can prompt the local temperature sensor to deliver its own report to the IoT controller independently. Alternatively, the secondary environmental information can simply be continuously monitored and reported independent of event detection (e.g., the IoT controller gets a report on the local temperature and humidity conditions irrespective of whether any events are actually detected by any of the IoT devices 1 . . . N at that time).

Referring to FIG. 7, while events are being detected and reported by IoT devices 1 . . . N between 700-710, a set of IoT motion monitors ("IoT motion monitors 1 . . . N") deployed within the IoT environment scans the IoT environment to detect "raw" motion data, 715. As used herein, an IoT motion monitor can correspond to any IoT device that is capable of monitoring motion in the IoT environment, and "raw" motion data is used to refer to any motion that is detectable by the IoT motion monitors and is not yet recognized as being part of a particular motion sequence (motion sequences are described below in more detail). Further, while "N" is used in FIG. 7 to describe the number of IoT motion monitors and also the number of IoT devices, "N" is merely to convey that the respective number of IoT motion monitors and IoT devices can vary between IoT environments, and the actual number of IoT devices and motion monitors in any particular IoT environment can either be the same or different. Also, it is possible that one of IoT devices 1 . . . N is also one of motion monitors 1 . . . N. For example, an IoT motion monitor that is capable of detecting motion in the IoT environment and is also capable of event detection can qualify as both an IoT motion monitor and an IoT device with respect to FIG. 7. For example, a motion monitor integrated into a ceiling fan would be capable of both detecting motion as well as registering when fan-related events occurred such as ceiling fan "ON", ceiling fan "OFF", and so on.

Referring to FIG. 7, IoT motion monitors 1 . . . N report the detected raw motion data and associated timing information from 715 to the IoT controller on a periodic basis, 720. Similar to 705, if the IoT controller is a remote server, the reports of 720 can be sent over an Internet connection, and if the IoT controller is a local server or local IoT device, the reports of 720 can be sent over the IoT communication interface (e.g., Bluetooth, WiFi, etc.). Also, similar to 710, the IoT motion monitors 1 . . . N can also optionally report secondary environmental data to the IoT controller, 725.

Referring to FIG. 7, the reports that are transmitted at 705, 710, 720 and/or 725 can be "pushed" to the IoT controller without an express request for the reports being sent by the IoT controller for each report, or alternatively the reports can be "pulled" by the IoT controller via one or more report requests. For example, the IoT controller can periodically poll IoT devices 1 . . . N and/or IoT motion monitors 1 . . . N to collect their respective reports, or alternatively IoT devices 1 . . . N and/or IoT motion monitors 1 . . . N can transmit their reports to the IoT controller without the polling. Alternatively, the IoT controller can poll IoT devices 1 . . . N and/or IoT motion monitors 1 . . . N in response to event(s) detected by the IoT controller to collect their respective reports, or alternatively IoT devices 1 . . . N and/or IoT motion monitors 1 . . . N can transmit their reports to the IoT controller in response to event(s) detected at the respective devices that ultimately transmit the reports.

Referring to FIG. 7, the IoT controller logs the reported events from 705 by their associated event-type (e.g., light switch "ON", ceiling fan "OFF", thermostat set to "COOL" or "HEAT", etc.) and (optionally) also records any associated secondary environmental data, 730. At 735, the IoT controller scans the reported raw motion detection data to identify, for each reported event, whether one or more motion sequences occurred within a threshold of time preceding the event, 735. For example, assume that the IoT controller logs a light switch "OFF" event at 10:23:22 PM, and that the threshold of time used for light switch "OFF" events is 25 seconds. This means that the IoT controller will scan the logged raw motion detection data for the 25 seconds preceding 10:23:22 PM to detect whether any motion sequences can be identified in that time period. Motion sequences can be comprised of series of motions that can be extracted from the logged raw motion detection data, and these motion sequences can correspond to actual user-motions such as a user standing up from a reclined position, a user raising his/her right hand and so on. Any motion sequences detected in the 25 second period are added to the log in association with that particular event. Also, the threshold period of time (or scanning window) where motion sequences are searched for prior to the detected event can vary based on any number of factors including event-type (e.g., light switch events may be allocated a 5 second scanning window because users that want to change the light status of their environment are expected to act relatively quickly, temperature/humidity setting change events to a thermostat can be allocated a longer scanning window because users may deliberate more before making a thermostat change, etc.).

At this point, 735 repeats for multiple events until a number of events for at least one event type exceeds a threshold (e.g., 20, 30, etc.). After a certain number of repetitions of 735, the IoT controller attempts to correlate a particular event type with a motion sequence (or sequences), 740. For example, after the 20$^{th}$ time a particular light switch (or any light switch in the IoT environment) is turned "OFF", the IoT controller may determine that it has a sufficient sample size for the event-type of light switch "OFF" to attempt to correlate the event type of light switch "OFF" with a motion sequence. In a further example, using the light switch "OFF" example, assume that 17 of the 20 light switch "OFF" events are preceded within the threshold period of time by a "user raises right arm" motion sequence, 6 of the 20 light switch "OFF" events are preceded within the threshold period of time by a "user stands up" motion sequence and 1 of the 20 light switch "OFF" events are preceded within the threshold period of time by a "user scratches head" motion sequence. This information can be used to generate a confidence level that a particular motion sequence will result in the associated event type of light switch "OFF". For example, the confidence level of light switch "OFF" is 85% for the "user raises right arm" motion sequence, 30% for the "user stands up" motion sequence and 5% for the "user scratches head" motion sequence. A confidence level threshold (e.g., 70%, 80%, etc.) can be established such that any candidate motion-to-event correlations with confidence levels below the threshold are discarded. In the above-noted example, this means that the "user raises right arm" motion sequence has been correlated with the light switch "OFF" event with a sufficient confidence level (i.e., 85%), but that the other outlier motion sequences are not correlated with the light switch "OFF" event at the threshold confidence level.

At 745, the correlation of 740 can optionally be refined based on one or more secondary factors. For example, a user probably walks to a light switch before flicking the switch to perform an "OFF" event or an "ON" event. However, the user most likely walks throughout the IoT environment at times when he/she has no intention of flicking the light switch. So, the mere detection of a "user walking" event does not by itself infer that the light switch is about to be flicked. Accordingly, motion sequences that occur in a frequent manner independently of a particular event are excluded from correlation with that event. In this case, the overall prevalence of the motion sequence (e.g., "user walking") functions to recharacterize (or refine) a candidate motion-to-event correlation to an uncorrelated status by reducing the confidence level. In other words, the confidence level reflects not only the likelihood that a particular motion sequence precedes a particular event-type, but also the likelihood that the particular event-type will follow that particular motion sequence. "Generic" motion sequences are thereby excluded from correlation unless one or more secondary factors are present to increase the confidence level as discussed below in more detail.

In another example, an event such as "user rubs forehead" could be an indication that the user has a headache, or alternatively that the user's forehead is sweaty because the user is hot. If the user is hot, it is likely that the user will adjust the thermostat setting. With this in mind, the "user rubs forehead" may only have a 5% confidence level of preceding a "user lowers thermostat temperature" event overall, but the "user rubs forehead" may have a 70% confidence level of preceding the "user lowers thermostat temperature" event if a current ambient room temperature where the user is located is above a temperature threshold (e.g., 85 degrees Fahrenheit). In this case, the current ambient room temperature can be reported as part of the secondary environmental data at 710 or 725, and this extra (or secondary) information can be used as an additional condition to refine the confidence level of a "user lowers thermostat temperature" event being preceded by a "user rubs forehead" motion sequence.

In another example, a user may have a habit of falling asleep while watching TV in his/her living room every night, and after waking up the user typically turns off the TV and the lights in his/her house and then going to sleep. In this case, the secondary factor that can be considered in conjunction with the motion sequence is time. In particular, the motion sequence of "user picks up remote and points it towards TV screen" may have a 2% confidence level of preceding a "turn off TV and lights" event overall (e.g., because the user performs this action when he/she turns on the TV or changes channels during the day), but may have a 99% confidence level when detected between midnight and 5 AM in the morning when the TV is in an "ON" state. In this case, the TV status of being "ON" can be reported as part of the secondary environmental data at 710 or 725, and this TV state information can be used along with the current time to improve refine the confidence level of a "user turns off TV and lights" event being preceded by a "user picks up remote and points it towards TV screen" motion sequence.

In another example, secondary factors need not be based on environmental data reported from the IoT devices 1 . . . N or motion monitors 1 . . . N. For example, a user may be an avid baseball and basketball sports fan for particular sports teams. During baseball season when a baseball game for the user's favorite team is on channel 5, a motion sequence of "user picks up remote and points it towards TV screen" may have a 92% confidence level of turning on the TV (if necessary) and navigating to channel 5 (if channel 5 is not already tuned). During basketball season when a basketball game for the user's favorite team is on channel 9, the motion sequence of "user picks up remote and points it towards TV screen" may have a 87% confidence level of turning on the TV (if necessary) and navigating to channel 5 (if channel 9 is not already tuned). So, current TV scheduling information can be used in combination with a user's sports interests as secondary factors for refining the confidence level for a particular event-type being preceded by a particular motion sequence.

In another example, the secondary factors can include negative feedback that functions to refine one or more correlations determined at 745. For example, assume that a correlation is detected at a 82% confidence level between a motion sequence of "user raises both hands" and a "turn on TV" event, and that the IoT controller uses the correlation to begin preemptively turning on the TV whenever the "user raises both hands" motion sequence is detected. However, in response to the preemptive turning on of the TV, the TV reports to the IoT controller that the user turns off the TV within a threshold period of time (e.g., 30 seconds, etc.). This is an implicit indication that the user did not want to turn on the TV, and also that the user is likely annoyed by the necessity to manually turn off the TV. Negative feedback (e.g., such as the user reversing a preemptive correlation-triggered event) can be used to refine the correlation by reducing the confidence level associated with the correlation, or even in some cases to remove the correlation altogether. Alternatively, the negative feedback can be used to identify additional conditions that are prerequisite for the correlation. For example, if the IoT controller determines over time that the user only turns off the TV when the TV is preemptively turned on between 10 PM and 5 AM, then the correlation can be refined by the negative feedback by de-activating the correlation between 10 PM and 5 AM. Accordingly, express user action that reverses a correlation-triggered event can be used to further refine an identified correlation.

In another example, the secondary factors can include state information that functions to refine one or more correlations determined at 745. The state information characterizes a state (or state history) of an object in the IoT environment (e.g., a set of available states for a TV can be "ON", "OFF", "ON with Volume Normal", "ON with volume muted", and so on). For example, the same motion used to turn a light to an "OFF" state may also be used to turn the light to an "ON" state. In this case, an OFF-to-ON event or an ON-to-OFF event is based in part upon a current state of the light, i.e., if the light is in the "ON" state than the motion triggers a transition to the "OFF" state, and if the light is in the "OFF" state than the motion triggers a transition to the "ON" state. So, a single motion (e.g., such a light change-inducing motion) can be used to trigger different types of events, depending on the state information.

Further, while the above-example is binary (e.g., the light is either "ON" or "OFF", and each successive motion simply switches between the two states), other examples can include more than two states or different state transition patterns. For example, consider a first motion used to increase the volume of a TV or to turn on the TV, and a second motion to decrease the volume of the TV or to turn off the TV. Further assume that the first motion does not trigger any event when the TV is turned on and set to a high volume setting, while that the second motion functions to turn the TV off when the TV is turned on and set to mute. Table 1 (below) shows an example series of state transitions that can occur based on the current TV state under these assumptions:

TABLE 1

| Current TV State | Motion | Event | New TV State |
|---|---|---|---|
| "OFF" | First Motion | Turn on TV | "ON" (Volume Normal) |
| "ON" (Volume Normal) | First Motion | Increase TV Volume | "ON" (Volume High) |
| "ON" (Volume High) | First Motion | Do Nothing (Volume Already High) | "ON" (Volume High) |
| "ON" (Volume High) | Second Motion | Decrease TV Volume | "ON" (Volume Normal) |
| "ON" (Volume Normal) | Second Motion | Decrease TV Volume | "ON" (Volume Muted) |
| "ON" (Volume Muted) | Second Motion | Turn Off TV | "OFF" |

Accordingly, the secondary factors can be used to add state-based nuance to event triggering, as shown in Table 1 (above). In another example, state histories can be used to refine the correlation. For example, assume that a vending machine can provide "Milk" or "Water", and that the IoT controller detects a user that uses a common vending motion sequence for triggering either beverage to be dispensed. Next, assume that the user has the reliable habit of dispensing "Water" twice, followed by a single dispensing of "Milk", an so only. So, an example state history is [Milk, Water, Water, Milk, Water, Water, Milk, . . . ]. Thereby, if a previous three states are [ . . . , Milk, Water, Water], the next state can be predicted as being "Milk", such that the common vending motion sequence will trigger "Milk" at this point instead of "Water" even though the same motion sequence is used that would more commonly dispense "Water". Accordingly, state histories can also be used to refine the event-to-motion sequence correlations.

The process of FIG. 7 can repeat for a period of time such that multiple correlations between motion sequences and various events are ascertained. It is possible that, over time, the IoT controller will identify motion sequences that are correlated to multiple events (independent of or in conjunction with one or more secondary factors), such that a single motion sequence satisfies the threshold confidence level for correlation with more than one event.

In an embodiment, both the initial confidence level determined at 740 and any refinements implemented at 745 are learned over time after the various IoT devices and motion monitors are deployed in the IoT environment, and are not programmed in advance prior to deployment. Actual real-world event detection is used to identify motion sequences that precede the events to dynamically ascertain correlations between certain motion sequences and actions in a user-specific manner. In other words, the IoT controller attempts to learn the motion sequences that are naturally used by the user in the IoT environment, and the user him/herself is not asked to learn pre-programmed motion sequences for triggering the actions.

Figure 8A:
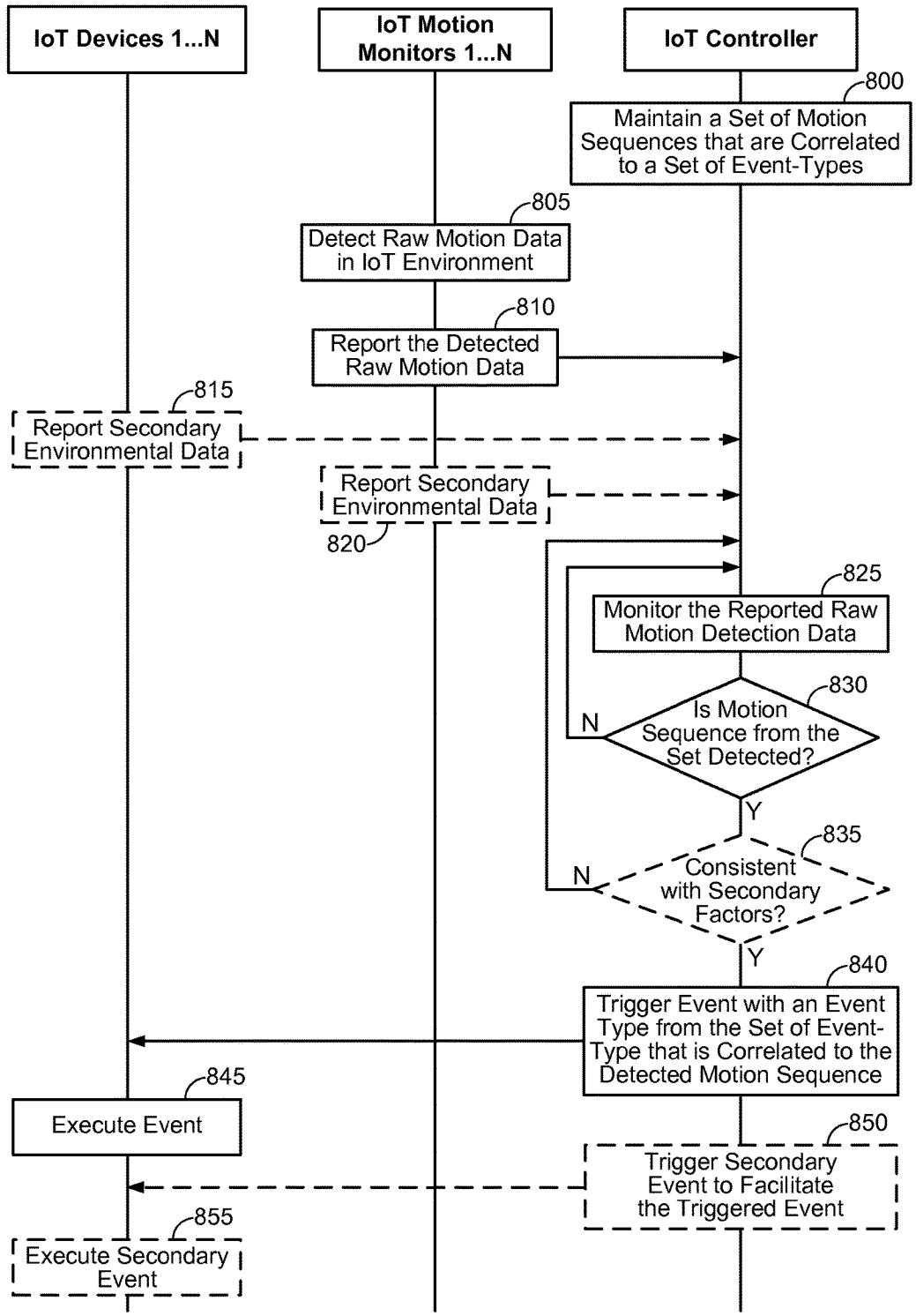
FIG. 8A illustrates a process of preemptively triggering events based on motion sequence correlations in accordance with an embodiment of the invention.

FIG. 8A illustrates a process of preemptively triggering events based on motion sequence correlations in accordance with an embodiment of the invention. In particular, the embodiment of FIG. 8A is directed to a centralized-approach whereby raw motion data is reported to the IoT controller and the IoT controller is responsible for identifying any motion sequences within the reported raw motion data and determining any correlated events. Additionally, the IOT controller is responsible for determining which event was triggered in a scenario where the same motion is correlated with multiple events (e.g., see discussion above with respect to state-based event triggering). For example, the same motion may turn a light on and off, and the desired outcome is dependent upon the current state (e.g., the motion triggers an "OFF" event if the current state of the light is "ON", and so on). In this case, the IOT controller would consult with the current state table and cross reference it with the history of state changes to identify the proper event to trigger.

Referring to FIG. 8A, after execution of the process of FIG. 7, assume that the IoT controller maintains a motion-to-event correlation table that specifies a set of motion sequences that are correlated with a set of event types at the threshold confidence level (independent of or in conjunction with secondary factors), 800. IoT motion monitors 1 . . . N continue to detect and report raw motion data in the IoT environment to the IoT controller, 805 and 810 (e.g., similar to 715 and 720 of FIG. 7). Also, IoT devices 1 . . . N and IoT motion monitors 1 . . . N continue to optionally detect and report secondary environmental data to the IoT controller, 815 and 820 (e.g., similar to 710 and 725 of FIG. 7).

Referring to FIG. 8A, the reports that are transmitted at 810, 815 and/or 820 can be "pushed" to the IoT controller without an express request for the reports being sent by the IoT controller for each report, or alternatively the reports can be "pulled" by the IoT controller via one or more report requests. For example, the IoT controller can periodically poll IoT devices 1 . . . N and/or IoT motion monitors 1 . . . N to collect their respective reports, or alternatively IoT devices 1 . . . N and/or IoT motion monitors 1 . . . N can transmit their reports to the IoT controller without the polling. Similarly, the IoT controller can poll IoT devices 1 . . . N and/or IoT motion monitors 1 . . . N in response to event(s) detected by the IoT controller to collect their respective reports, or alternatively IoT devices 1 . . . N and/or IoT motion monitors 1 . . . N can transmit their reports to the IoT controller in response to event(s) detected at the respective devices that ultimately transmit the reports.

The IoT controller monitors the reported raw motion detection data, 825, to determine whether any motion sequences from the set of motion sequences in the motion-to-event correlation table are detected, 830. If the IoT controller does not detect any motion sequences from the set of motion sequences at 830, the process returns to 825 and the IoT controller continues to monitor the reported raw motion detection data. Otherwise, if the IoT controller does not detect one of the motion sequences from the set of motion sequences at 830, the IoT controller optionally determines whether the detected motion sequence is consistent with one or more secondary factors that are required for event-type correlation at the threshold confidence level, 835. As noted above, the secondary factors can include TV scheduling information, ambient room temperature data, time of day or day of week, etc. If the IoT controller determines that the detected motion sequence is not consistent with the one or more secondary factors that are required for event-type correlation at the threshold confidence level at 835, the process returns to 825 and the IoT controller continues to monitor the reported raw motion detection data. Otherwise, if the IoT controller determines that the detected motion sequence is consistent with the one or more secondary factors that are required for event-type correlation at the threshold confidence level (or if the detected motion sequence is not dependent upon any secondary factors for event-type correlation) at 835, the IoT controller sends one or more signaling for preemptively triggering an event with the event-type (or types) correlated to the detected motion sequence, 840. For example, if the correlated event-types are light switch "ON" and ceiling fan "ON", the IoT controller may send signaling to a particular light switch and a particular ceiling fan that instructs the light switch to turn "ON" and the ceiling fan to turn "ON" without any direct user interaction. At 845, one or more of the IoT devices 1 . . . N receive the signaling from the IoT controller and execute one or more actions for the event, 845. As will be appreciated from the above disclosure, the particular event (or action) triggered by the IoT controller at 840 can be based upon state information (e.g., a particular motion sequence will trigger an "ON" event for a light if the state of the light is "OFF" while triggering an "OFF" event for the light if the state of the light is "ON", and so on).

Referring to FIG. 8A, the IoT controller can also optionally trigger one or more secondary events to facilitate the execution of the event at 845, 850-855. For example, assume that the event being executed at 845 is "starting a hot shower in the master bathroom" and that the IoT controller knows that the user typically uses 25 gallons of hot water during each shower, that 30 gallons of hot water are currently available in a hot water tank for the shower, and that a washing machine is starting a wash cycle expected to use 15 gallons of hot water. This information can be ascertained at least in part from the secondary environmental data reported at 815 and/or 820 (e.g., if a hot water tank and washing machine are among IoT devices 1 . . . N). In an example, the IoT controller can prioritize the "starting a hot shower in the master bathroom" event over the wash cycle of the washing machine by triggering a secondary event of delaying the wash cycle until after the shower. In another example, the IoT controller can attempt to accommodate the timing of both events by lowering the temperature of water used by the shower or the wash cycle (or both). While not shown explicitly in FIG. 8A, the user can optionally be notified of the secondary event (e.g., "hot water in shower being reduced in temperature to accommodate wash cycle", "wash cycle being discontinued until after shower to secure hot water for your shower", etc.).

Figure 8B:
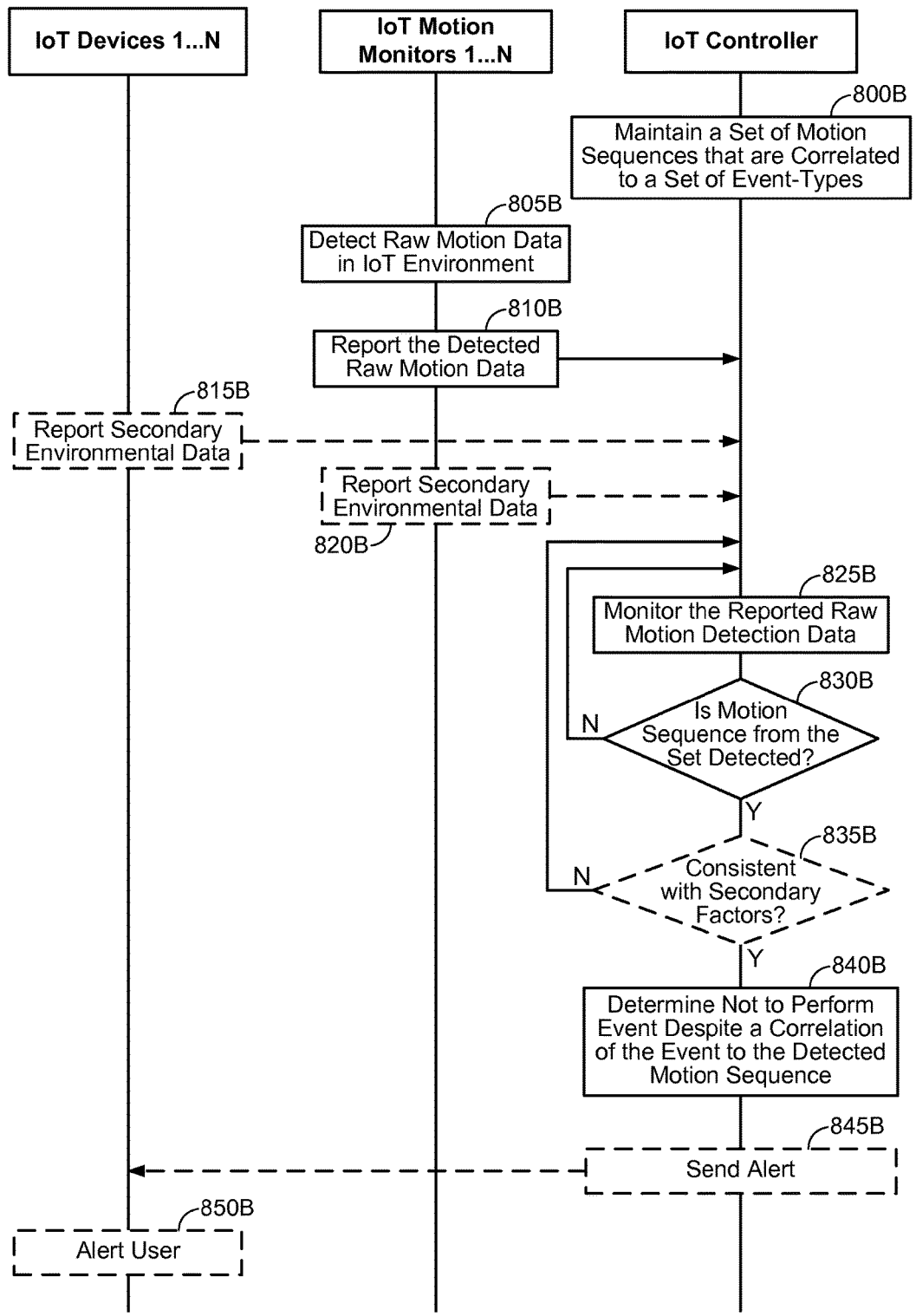
FIG. 8B illustrates a process of preemptively triggering events based on motion sequence correlations in accordance with another embodiment of the invention.

FIG. 8B illustrates a process of preemptively triggering events based on motion sequence correlations in accordance with another embodiment of the invention. Referring to FIG. 8B, 800B through 835B correspond to 800 through 835 of FIG. 8A, respectively, and will not be described further for the sake of brevity.

Unlike FIG. 8A, in FIG. 8B, after the IoT controller identifies an event that is sufficiently correlated with a detected motion sequence at 825B-835B, the IoT controller determines not to perform the event, 840B. The determination to overrule the event correlation by not performing the event can be based on a variety of factors, including the secondary environmental data reported at 815B or 820B. For example, assume that the event that is correlated to the motion sequence detected at 825B-835B is "turning on kitchen light", but that the IoT controller is aware (e.g., either apriori or through a failed attempt to turn on the light) that the kitchen light is broken or unpowered. Thus, the determination of 840B can correspond to a determination that the event is not possible or practical. In another example, assume that the event is "starting a hot shower in the master bathroom", and that the IoT controller is aware that two other hot showers are currently active in the user's house and that the hot water heater cannot accommodate all three showers simultaneously. In this case, the event could be partially accommodated, but only at the expense of other users who are already showering. Thus, the determination of 840B can correspond to a determination that the event is possible (at least in part) but not recommended.

After determining not to perform the event at 840B, the IoT controller optionally sends an alert to one or more of IoT devices 1 . . . N, 845B, for alerting the user that the event will not be performed and also optionally a reason for the event not being performed, 850B. For example, the user's IoT phone can be prompted to display "kitchen light is not being turned on" or "kitchen light is not being turned on because kitchen light bulb is broken". In another example, the user's IoT radio in his/her bathroom can be prompted to output "shower is not being turned on because insufficient hot water is available—please wait 10 minutes before showering" via its speaker(s). As will be appreciated from the above disclosure, the decision by the IoT controller not to trigger the event at 840B can be based upon state information (e.g., a particular motion sequence will trigger an "ON" event for a TV if the state of the TV is "OFF", while the same motion sequence would not trigger the "ON" event if the TV was already in an "ON" state, and so on).

In FIG. 8B, while the automatic or preemptive event is not performed in a preemptive or correlation-triggered manner, the user can still attempt to manually perform the event. Thus, in an example, even though IoT controller knows the light bulb in the kitchen is broken, the user may attempt to flick the light switch to confirm the light bulb status before replacing the light bulb. In another example, even though IoT controller prioritizes the hot water of the existing showers over the user's shower, the user may be in a rush and may be willing to take a cold or lukewarm shower immediately rather than wait for more hot water to become available.

Figure 9A:
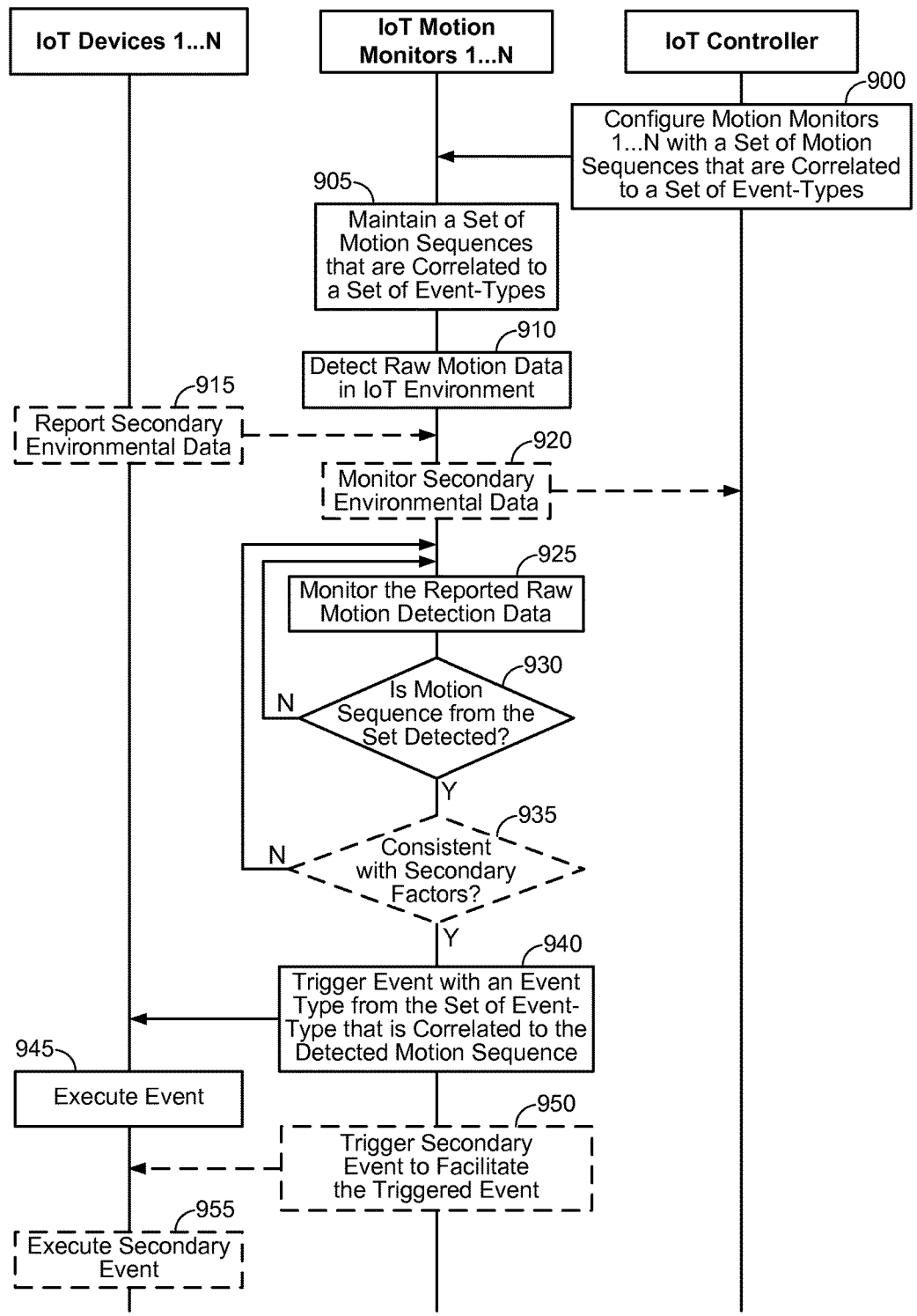
FIG. 9A illustrates a process of preemptively triggering events based on motion sequence correlations in accordance with another embodiment of the invention.

FIG. 9A illustrates a process of preemptively triggering events based on motion sequence correlations in accordance with another embodiment of the invention. In contrast to FIG. 8A, the embodiment of FIG. 9A is directed to a distributed-approach whereby the individual IoT motion monitors are responsible for identifying any motion sequences within the reported raw motion data and determining any correlated events.

Referring to FIG. 9A, after execution of the process of FIG. 7, the IoT controller configures IoT motion monitors 1 . . . N with a motion-to-event correlation table that specifies a set of motion sequences that are correlated with a set of event types at the threshold confidence level (independent of or in conjunction with secondary factors), 900. IoT motion monitors 1 . . . N thereafter maintain the motion-to-event correlation table (which potentially includes secondary factors as well) instead of relying upon the IoT controller to perform this function. While not shown in FIG. 9A explicitly, 900-905 can repeat as new event-types are correlated to particular motion sequences and/or as other event-types become uncorrelated with their previously correlated motion sequences, such that the IoT motion monitors 1 . . . N can maintain a relatively up-to-date motion-to-event correlation table.

Referring to FIG. 9A, IoT motion monitors 1 . . . N continue to detect raw motion data in the IoT environment, 910. While not shown in FIG. 9A, the detected raw motion data from 910 can be reported to the IoT controller similar to 720 of FIG. 7 for the purpose of identifying additional motion-to-event correlations. Also, IoT devices 1 . . . N and IoT motion monitors 1 . . . N continue to optionally detect secondary environmental data to the IoT controller, 915 and 920 (e.g., similar to 710 and 725 of FIG. 7). The IoT devices 1 . . . N report the secondary environmental data to IoT motion monitors 1 . . . N at 915 in FIG. 9A (e.g., via a push protocol or a push protocol as discussed above), but the IoT motion monitors are configured to use the secondary environmental data locally to detect motion sequences such that the secondary environmental data is not shown as reported to the IoT controller in FIG. 9A. However, while not shown in FIG. 9A, the secondary environmental data obtained at 915 or 920 can also be reported to the IoT controller similar to 710 and 725 of FIG. 7 for the purpose of identifying (and helping to refine) additional motion-to-event correlations.

Each of IoT motion monitors 1 . . . N monitors its own detected raw motion detection data, 925, to determine whether any motion sequences from the set of motion sequences in the motion-to-event correlation table are detected, 930 (e.g., similar of 830 of FIG. 8A except for being implemented in a distributed manner by the individual IoT motion monitors instead of a centralized IoT controller). If a given IoT motion monitor does not detect any motion sequences from the set of motion sequences as being present within its own detected raw motion detection data at 930, the process returns to 925 and the given IoT motion monitor continues to monitor its own detected raw motion detection data. Otherwise, if the given IoT motion monitor does not detect one of the motion sequences from the set of motion sequences at 930, the given IoT motion monitor optionally determines whether the detected motion sequence is consistent with one or more secondary factors that are required for event-type correlation at the threshold confidence level, 935 (e.g., to 835 of FIG. 8A except for being implemented in a distributed manner by the individual IoT motion monitors instead of a centralized IoT controller).

As noted above, the secondary factors can include TV scheduling information, ambient room temperature data, time of day or day of week, etc. If the given IoT motion monitor determines that the detected motion sequence is not consistent with the one or more secondary factors that are required for event-type correlation at the threshold confidence level at 935, the process returns to 925 and the given IoT motion monitor continues to monitor its own detected raw motion detection data. Otherwise, if the given IoT motion monitor determines that the detected motion sequence is consistent with the one or more secondary factors that are required for event-type correlation at the threshold confidence level (or if the detected motion sequence is not dependent upon any secondary factors for event-type correlation) at 935, the given IoT motion monitor sends one or more signaling messages for preemptively triggering an event with the event-type (or types) correlated to the detected motion sequence, 940 (e.g., similar to 840 of FIG. 8A except for being implemented in a distributed manner by the individual IoT motion monitors instead of a centralized IoT controller).

For example, if the correlated event-types are light switch "ON" and ceiling fan "ON", the given IoT motion monitor may send signaling to a particular light switch and a particular ceiling fan that instructs the light switch to turn "ON" and the ceiling fan to turn "ON" without any direct user interaction. At 945, one or more of the IoT devices 1 . . . N receive the signaling from the given IoT motion monitor and execute one or more actions for the event, 945. At 950, the given IoT motion monitor optionally triggers one or more secondary events to facilitate the triggered event from 945 (e.g., as described above with respect to 850 of FIG. 8A except for being implemented in a distributed manner by the individual IoT motion monitors instead of a centralized IoT controller), and one or more of the IoT devices 1 . . . N perform the one or more secondary events, 955 (e.g., as described above with respect to 855 of FIG. 8A). As will be appreciated from the above disclosure, the particular event (or action) triggered by the IoT motion monitor at 940 can be based upon state information (e.g., a particular motion sequence will trigger an "ON" event for a light if the state of the light is "OFF" while triggering an "OFF" event for the light if the state of the light is "ON", and so on).

Figure 9B:
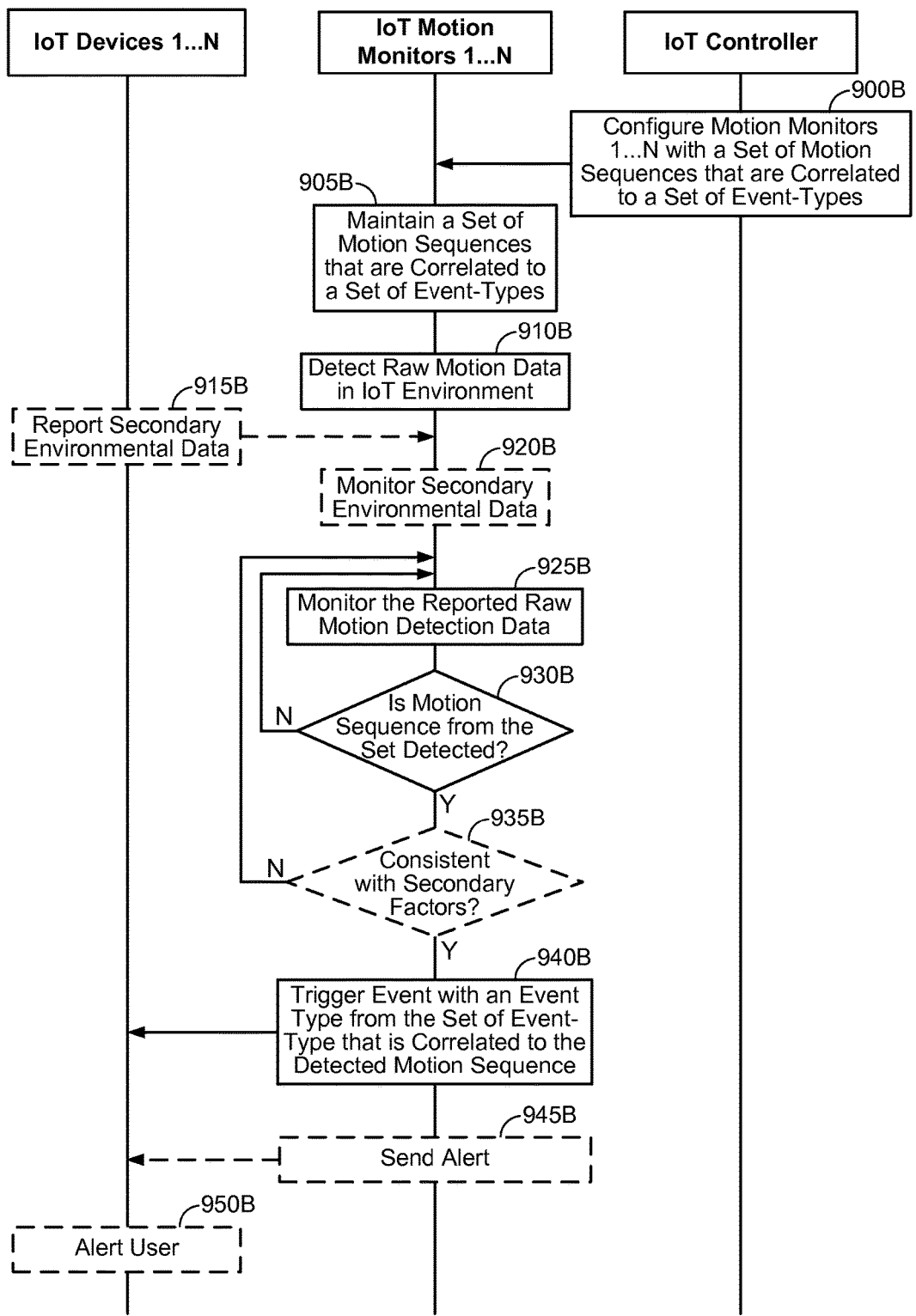
FIG. 9B illustrates a process of preemptively triggering events based on motion sequence correlations in accordance with another embodiment of the invention.

FIG. 9B illustrates a process of preemptively triggering events based on motion sequence correlations in accordance with another embodiment of the invention. Referring to FIG. 9B, 900B through 935B correspond to 800 through 835 of FIG. 8A, respectively, and will not be described further for the sake of brevity.

Unlike FIG. 9A, in FIG. 9B, after the given IoT motion monitor identifies an event that is sufficiently correlated with a detected motion sequence at 925B-935B, the given IoT motion monitor determines not to perform the event, 940B (e.g., as described above with respect to 840B of FIG. 8B except for being implemented in a distributed manner by the individual IoT motion monitors instead of a centralized IoT controller). After determining not to perform the event at 940B, the given IoT motion monitor optionally sends an alert to one or more of IoT devices 1 . . . N, 945B (e.g., as described above with respect to 845B of FIG. 8B except for being implemented in a distributed manner by the individual IoT motion monitors instead of a centralized IoT controller), for alerting the user that the event will not be performed and also optionally a reason for the event not being performed, 950B (e.g., as described above with respect to 850B of FIG. 8B). As will be appreciated from the above disclosure, the decision by the IoT motion monitor not to trigger the event at 940B can be based upon state information (e.g., a particular motion sequence will trigger an "ON" event for a TV if the state of the TV is "OFF", while the same motion sequence would not trigger the "ON" event if the TV was already in an "ON" state, and so on).

Figure 10:
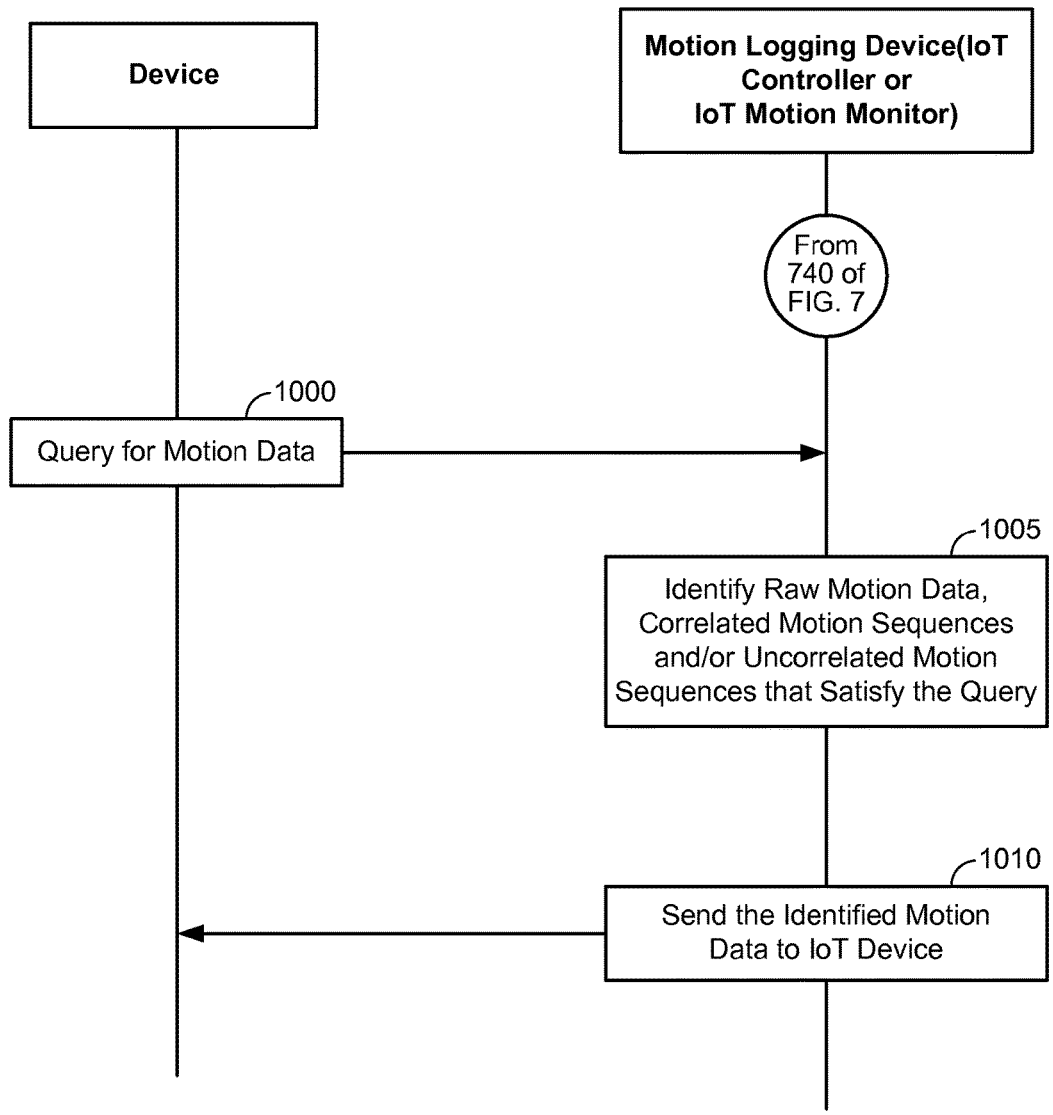
FIG. 10 illustrates a process of querying for motion data in accordance with an embodiment of the invention.

FIG. 10 illustrates a process of querying for motion data in accordance with an embodiment of the invention. As described above with respect to FIGS. 7-9B, the motion data reported at 715-720 of FIG. 7 can be used to develop sequence-to-event correlations used for selectively (and preemptively) triggering events in the IoT environment. However, it is also possible that any of the devices that tracks the motion data can also distribute the motion data to one or more interested devices.

Referring to FIG. 10, at some point after 740 of FIG. 7, a given device (e.g., an IoT device that is deployed in the IoT environment, a device that is remote from the IoT environment, etc.) determines to fetch motion data related to the IoT environment and sends a query for the motion data to a motion logging device, 1000. For example, the given device can correspond to an IoT device (e.g., a thermostat, etc.) deployed in the IoT environment. In another example, the given device can correspond to a device that is remote from the IoT environment (e.g., a remote user may be a parent using the motion monitoring as part of a baby monitoring function, in which case the query is for motion data related to the baby in the IoT environment, etc.). The motion logging device can correspond to an individual IoT motion monitor which is not acting as the IoT controller or to the IoT controller itself. If the motion logging device corresponds to the individual IoT motion monitor, then the query functions to query motion data logged by that particular IoT motion monitor. If the motion logging device corresponds to the IoT controller, then the query can function to query motion data logged from any IoT motion monitor for which the IoT controller collects motion data.

Referring to 1000 of FIG. 10, in an example, the query can be generic in terms of the type of motion data being requested (e.g., "return all recent motion data detected in IoT environment") or can be specific in terms of the type of motion data being requested (e.g., "return a history of all logged raw motion data", "return motion sequences that are correlated with at least two different events and have been detected in the IoT environment within the previous four hours", "return motion sequences that are uncorrelated and were detected between the hours of 4 PM and 6 PM during Monday-Friday of the previous week", "return motion sequences that are correlated with a single event and have been detected in the IoT environment within the previous 15 minutes only by IoT monitor(s) deployed in proximity to the kitchen", etc.).

At 1005, the motion logging device attempts to identify motion data that will satisfy the query from 1000. As will be appreciated, the motion logging device can compare the parameters of the query with logs of the reported raw motion data and/or motion sequences (correlated or uncorrelated) detected in the IoT environment. As used herein, an "uncorrelated" motion sequence is simply a motion sequence that has been observed in the IoT environment but has not yet been correlated to any event at the given confidence level. Any motion data satisfying the query is returned to the querying device by the motion logging device at 1010. While not shown, the querying device (or its user) may opt to perform one or more actions based on an analysis of the returned motion data.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating an apparatus, comprising:
receiving one or more reports of raw motion data detected by a set of motion monitors in an Internet of Things (IoT) environment;
receiving one or more reports indicating one or more user-initiated events detected by a set of IoT devices within the IoT environment, each of the one or more detected user-initiated events associated with one of a plurality of different event-types;
scanning, for each of the one or more detected user-initiated events, the reported raw motion data within a threshold period of time preceding the detected user-initiated event to identify one or more motion sequences including at least one user-initiated gesture within the IoT environment that occurred during the threshold period of time;
correlating a given event-type from the plurality of different event-types with a given user-initiated gesture for the IoT environment based at least in part by predicting, based on the scanning of the reported raw motion data, that a given user-initiated event with the given event-type will follow the given user-initiated gesture within the threshold period of time at a confidence level that exceeds a threshold confidence level for correlation;
detecting the given user-initiated gesture within the IoT environment after the correlating; and
triggering one or more IoT devices from the set of IoT devices to perform a given event with the given event-type without user interaction based on the correlating and in response to the detection.

2. The method of claim 1, wherein the apparatus is an IoT controller that is implemented as a server that is remote from the IoT environment.

3. The method of claim 1, wherein the apparatus is an IoT controller that is implemented as an IoT device in the IoT environment.

4. The method of claim 1, wherein the apparatus corresponds to a given motion monitor from the set of motion monitors.

5. The method of claim 1, wherein the correlation of the given event-type with the given user-initiated gesture is refined by negative user feedback.

6. The method of claim 1, wherein the correlation of the given event-type with the given user-initiated gesture is refined by a consideration of one or more secondary factors.

7. The method of claim 6, wherein the one or more secondary factors include state information.

8. The method of claim 7,
wherein an object within the IoT environment is configured to currently have one of a plurality of different states or one of a plurality of different state histories, and
wherein the correlating correlates one or more different event-types with the given user-initiated gesture based on which state or state history is determined to be current for the object.

9. The method of claim 1, wherein the one or more reports that report the raw motion data and/or the one or more reports that report the one or more detected user-initiated events are received by the apparatus in a periodic or event-driven manner without polling by the apparatus.

10. The method of claim 1, further comprising:
polling the set of motion monitors and/or the set of IoT devices in a periodic or event driven manner,
wherein the one or more reports that report the raw motion data and/or the one or more reports that report the one or more detected user-initiated events are received by the apparatus in response to the polling.

11. The method of claim 1, further comprising:
receiving a query from a given device for at least a portion of the reported raw motion data and/or one or more motion sequences detected in the IoT environment;
attempting to identify motion data that will satisfy the query; and returning the identified motion data to the given device, if found.

12. The method of claim 1, wherein the given user-initiated gesture includes:
scratching and/or rubbing his/her head,
raising one or more of his/her hands,
pointing a remote control towards a target control device,
standing up, or
any combination thereof.

13. The method of claim 1, further comprising:
configuring the threshold period of time to be used for the scanning based on an event-type of the detected user-initiated event,
wherein different event-types are associated with different scanning periods based on an amount of time that each event-type is expected to take for a user to perform.

14. A method of operating an apparatus, comprising:
determining that a given event-type that is performed by one or more IoT devices in an Internet of Things (IoT) environment is correlated with a given user-initiated gesture based upon an expectation that the given event-type will follow the given user-initiated gesture after the given user-initiated gesture is detected in the IoT environment within a threshold period of time at a confidence level that exceeds a threshold confidence level for correlation;
scanning raw motion data that is monitored within the IoT environment;
detecting the given user-initiated gesture within the scanned raw motion data; and
triggering, in response to the detection, the one or more IoT devices within the IoT environment to perform a given event with the given event-type without user interaction based on the determination.

15. The method of claim 14, wherein the apparatus is an IoT controller that is implemented as a server that is remote from the IoT environment.

16. The method of claim 14, wherein the apparatus is an IoT controller that is implemented as an IoT device in the IoT environment.

17. The method of claim 14, wherein the apparatus corresponds to a given motion monitor that is configured to monitor motion within the IoT environment.

18. The method of claim 14, wherein the triggering includes:
selecting the given event from a plurality of events correlated with the given user-initiated gesture based upon state information.

19. The method of claim 18, further comprising:
determining a current state or a current state history associated with an object within the IoT environment that is configured to have one of a plurality of different states or different state histories, and
wherein the selecting selects the given event based on the current state or the current state history associated with the object.

20. An apparatus, comprising:
logic configured to receive one or more reports of raw motion data detected by a set of motion monitors in an Internet of Things (IoT) environment;
logic configured to receive one or more reports indicating one or more user-initiated events detected by a set of IoT devices within the IoT environment, each of the one or more detected user-initiated events associated with one of a plurality of different event-types;
logic configured to scan, for each of the one or more detected user-initiated events, the reported raw motion data within a threshold period of time preceding the detected user-initiated event to identify one or more motion sequences including at least one user-initiated gesture within the IoT environment that occurred during the threshold period of time;
logic configured to correlate a given event-type from the plurality of different event-types with a given user-initiated gesture for the IoT environment based at least in part by predicting, based on the scan of the reported raw motion data, that a given user-initiated event with the given event-type will follow the given user-initiated gesture within the threshold period of time at a confidence level that exceeds a threshold confidence level for correlation;
logic configured to detect the given user-initiated gesture within the IoT environment after the correlation; and
logic configured to trigger one or more IoT devices from the set of IoT devices to perform a given event with the given event-type without user interaction based on the correlation and in response to the detection.

21. The apparatus of claim 20, wherein the apparatus is an IoT controller that is implemented (i) as a server that is remote from the IoT environment, or as an IoT device in the IoT environment.

22. The apparatus of claim 20,
wherein the correlation of the given event-type with the given user-initiated gesture is refined by negative user feedback, and/or
wherein the correlation of the given event-type with the given user-initiated gesture is refined by a consideration of one or more secondary factors.

23. The apparatus of claim 20, wherein the one or more reports that report the raw motion data and/or the one or more reports that report the one or more detected user-initiated events are received by the apparatus in a periodic or event-driven manner without polling by the apparatus.

24. The apparatus of claim 20, further comprising:
logic configured to receive a query from a given device for at least a portion of the reported raw motion data and/or one or more motion sequences detected in the IoT environment;
logic configured to attempt to identify motion data that will satisfy the query; and
logic configured to return the identified motion data to the given device, if found.

25. An apparatus, comprising:
logic configured to determine that a given event-type that is performed by one or more IoT devices in an Internet of Things (IoT) environment is correlated with a given user-initiated gesture based upon an expectation that the given event-type will follow the given user-initiated gesture after the given user-initiated gesture is detected in the IoT environment within a threshold period of time at a confidence level that exceeds a threshold confidence level for correlation;
logic configured to scan raw motion data that is monitored within the IoT environment;
logic configured to detect the given user-initiated gesture within the scanned raw motion data; and
logic configured to trigger, in response to the detection, the one or more IoT devices within the IoT environment to perform a given event with the given event-type without user interaction based on the determination.

26. The apparatus of claim 25, wherein the apparatus is an IoT controller that is implemented as a server that is remote from the IoT environment.

27. The apparatus of claim 25, wherein the apparatus is an IoT controller that is implemented as an IoT device in the IoT environment.

28. The apparatus of claim 25, wherein the apparatus corresponds to a given motion monitor that is configured to monitor motion within the IoT environment.

29. The apparatus of claim 25, wherein the logic configured to trigger selects the given event from a plurality of events correlated with the given user-initiated gesture based upon state information.

30. The apparatus of claim 29, further comprising:
   logic configured to determine a current state or a current state history associated with an object within the IoT environment that is configured to have one of a plurality of different states or different state histories, and
   wherein the logic configured to trigger selects the given event based on the current state or the current state history associated with the object.

* * * * *